US012750105B2

(12) United States Patent
Xu et al.

(10) Patent No.: US 12,750,105 B2
(45) Date of Patent: Sep. 29, 2026

(54) CHANNEL STATE INFORMATION PROCESSING METHOD AND COMMUNICATION APPARATUS

(71) Applicant: Huawei Technologies Co., Ltd., Shenzhen (CN)

(72) Inventors: Jianbiao Xu, Shanghai (CN); Gaoning He, Boulogne-Billancourt (FR); Jianmin Lu, Shenzhen (CN)

(73) Assignee: Huawei Technologies Co., Ltd., Shenzen (CN)

(*) Notice: Subject to any disclaimer, the term of this patent is extended or adjusted under 35 U.S.C. 154(b) by 677 days.

(21) Appl. No.: 18/174,380

(22) Filed: Feb. 24, 2023

(65) Prior Publication Data

US 2023/0318675 A1 Oct. 5, 2023

Related U.S. Application Data

(63) Continuation of application No. PCT/CN2021/111673, filed on Aug. 10, 2021.

(30) Foreign Application Priority Data

Aug. 25, 2020 (CN) ......................... 202010865817.0

(51) Int. Cl.
*H04B 7/0456* (2017.01)
*H04B 7/06* (2006.01)
*H04B 7/0413* (2017.01)

(52) U.S. Cl.
CPC ......... *H04B 7/0626* (2013.01); *H04B 7/0456* (2013.01); *H04B 7/0413* (2013.01)

(58) Field of Classification Search
None
See application file for complete search history.

(56) References Cited

U.S. PATENT DOCUMENTS

| | | | | |
|---|---|---|---|---|
| 10,686,503 B2* | 6/2020 | Kim | ...................... | H04L 5/0025 |
| 11,050,476 B2* | 6/2021 | Wu | ...................... | H04L 5/0051 |

(Continued)

FOREIGN PATENT DOCUMENTS

| | | | | |
|---|---|---|---|---|
| CN | 110311718 A | * 10/2019 | ........... | H04B 7/0626 |
| CN | 109565329 B | * 10/2021 | ........... | H04W 72/54 |

(Continued)

OTHER PUBLICATIONS

Cavalcante et al., A Novel Model of Beamspace Beamforming Coefficients for Fronthaul Load Reduction, IEEE International Conference on Communication (ICC) (Year: 2019).*

(Continued)

*Primary Examiner* — Mohammed Rachedine
(74) *Attorney, Agent, or Firm* — Slater Matsil, LLP

(57) ABSTRACT

A channel state information processing method and a communication apparatus. The method includes obtaining CSI information of a channel, where the CSI information includes an N-dimensional antenna domain coefficient, and N is an integer greater than 1; performing a beam domain transformation on the CSI information based on an array response feature, to obtain first CSI transformation information that includes an N-dimensional beam domain coefficient; performing a cluster sparse domain transformation on the first CSI transformation information based on a cluster sparse transformation basis, to obtain second CSI transformation information that includes an N-dimensional cluster sparse domain coefficient and the cluster sparse transformation basis is determined based on a channel prior statistical feature of the channel; and sending quantized values of L cluster sparse domain coefficients in the N-dimensional cluster sparse domain coefficient to a second communication apparatus, where Lis a positive integer less than N.

18 Claims, 11 Drawing Sheets

Network device

(56) References Cited

U.S. PATENT DOCUMENTS

| | | | | |
|---|---|---|---|---|
| 2019/0341976 | A1* | 11/2019 | Nam | H04B 7/0456 |
| 2020/0067588 | A1* | 2/2020 | Jin | H04B 7/0626 |
| 2021/0126692 | A1* | 4/2021 | Chung | H04B 7/0626 |

FOREIGN PATENT DOCUMENTS

| | | | | | |
|---|---|---|---|---|---|
| CN | 113892238 | A | * | 1/2022 | H04B 7/0639 |
| CN | 114982146 | A | * | 8/2022 | H04W 72/542 |
| WO | WO-2020135101 | A1 | * | 7/2020 | H04B 7/0663 |

OTHER PUBLICATIONS

3GPP Ts 38.214 V16.2.0 (Jun. 2020), 3rd Generation Partnership Project; Technical Specification Group Radio Access Network; NR; Physical layer procedures for data (Release 16), Jun. 2020, total 163 pages.
Cavalcante Andre et al: "A Novel Model of Beamspace Beamforming Coefficients for Fronthaul Load Reduction", ICC 2019—2019 IEEE International Conference on Communications (ICC), IEEE, May 20, 2019 (May 20, 2019) , pp. 1-6.
Z. Zhou, X. Gao, J. Fang, and Z. Chen, Spherical Wave Channel and Analysis for Large Linear Array in LoS Conditions, in Proc. IEEE Glob. Telecommun. Conf. (GLOBECOM), Dec. 2015, pp. 1 6.
X. Gao, F. Tufvesson, and O. Edfors, Massive MIMO channels Measurements and models, in Proc. 47th Annu. Asilomar Conf. Signals, Syst., Comput., Paci c Grove, VA, USA, Nov. 2013, pp. 280 284.
R. Zhang, X. Lu, J. Zhao, L. Cai, and J. Wang, Measurement and modeling of angular spreads of three-dimensional urban street radio channels, IEEE Trans. Veh. Technol., May 2017, total 15 pages.

* cited by examiner

CHANNEL STATE INFORMATION PROCESSING METHOD AND COMMUNICATION APPARATUS

CROSS-REFERENCE TO RELATED APPLICATIONS

This application is a continuation of International Application No. PCT/CN2021/111673, filed on Aug. 10, 2021, which claims priority to Chinese Patent Application No. 202010865817.0, filed on Aug. 25, 2020. The disclosures of the aforementioned applications are hereby incorporated by reference in their entireties.

TECHNICAL FIELD

Embodiments of this application relate to the communication field, and in particular, to a channel state information processing method and a communication apparatus.

BACKGROUND

In a wireless communication system, a terminal device feeds back channel quality to a network device by using channel state information CSI (CSI), so that the network device selects an appropriate modulation and coding scheme for downlink transmission, thereby improving data transmission performance.

With introduction of technologies such as massive multiple-input multiple-output (Massive-MIMO), a quantity of antennas continuously increases, and information contained in CSI becomes richer, resulting in higher signaling overheads. Currently, a CSI feedback process in the conventional technology usually uses a discrete Fourier transform (DFT)-based CSI compression technology. The terminal device performs a DFT transformation on a CSI estimation value, and feeds back a beam component obtained after the DFT transformation. However, as the quantity of antennas increases, a magnitude of a beam domain coefficient obtained after the DFT transformation also increases. Further, a feedback amount increases consequently, and feedback overheads are relatively high. To reduce the feedback overheads, a quantity of feedback coefficients (which may also be referred to as beam components) needs to be reduced. However, reduction of the beam components to be fed back causes a CSI feedback error and a precoding performance loss to increase.

SUMMARY

This application provides a CSI information processing method and a communication apparatus, to reduce a CSI feedback error and a precoding performance loss while reducing channel overheads.

To achieve the foregoing objective, the following technical solutions are used in this application.

According to a first aspect, an embodiment of this application provides a CSI information processing method. The method includes: obtaining CSI information of a channel, where the CSI information includes an N-dimensional antenna domain coefficient, and N is an integer greater than 1; performing a beam domain transformation on the CSI information based on an array response feature, to obtain first CSI transformation information, where the first CSI transformation information includes an N-dimensional beam domain coefficient; performing a cluster sparse domain transformation on the first CSI transformation information based on a cluster sparse transformation basis, to obtain second CSI transformation information, where the second CSI transformation information includes an N-dimensional cluster sparse domain coefficient and the cluster sparse transformation basis is determined based on a channel prior statistical feature of the channel; and sending quantized values of L cluster sparse domain coefficients in the N-dimensional cluster sparse domain coefficient to a second communication apparatus, where L is a positive integer less than N. In this way, in this application, a secondary transformation, that is, a cluster sparse transformation, is performed on the beam domain coefficient, so that the beam domain beam is compressed to a cluster sparse domain, to achieve an objective of dimension reduction. Therefore, feedback overheads are reduced, CSI feedback precision is improved, and further, a precoding performance loss is reduced.

According to the first aspect, the channel prior statistical feature is used to indicate a statistical covariance matrix corresponding to the N-dimensional beam domain coefficient, and the cluster sparse transformation basis is an eigenvector corresponding to the statistical covariance matrix. In this way, the apparatus can construct the cluster sparse transformation basis based on the obtained statistical covariance matrix.

According to the first aspect or any implementation of the first aspect, indication information is sent to the second communication apparatus, where the indication information is used to indicate the statistical covariance matrix or the eigenvector corresponding to the statistical covariance matrix. In this way, a peer apparatus, such as the second communication apparatus, may be configured with the same cluster sparse transformation basis as a first communication apparatus.

According to the first aspect or any implementation of the first aspect, the statistical covariance matrix is determined based on sample values of a plurality of N-dimensional beam domain coefficients. In this way, a manner of obtaining the statistical covariance matrix is provided in this application as an example. It should be noted that in another embodiment, the statistical covariance matrix may also be obtained in another manner. This is not limited in this application.

According to the first aspect or any implementation of the first aspect, the channel prior statistical feature is used to indicate a cluster sparse feature of a plurality of beam channel clusters corresponding to the N-dimensional beam domain coefficient, and the cluster sparse feature includes at least one of the following: sizes of the beam channel clusters, shapes of the beam channel clusters, and cluster spacings of the beam channel clusters. In this way, another manner of obtaining the channel prior statistical feature approximate to a covariance matrix is shown in this application as an example, to reduce a calculation amount.

According to the first aspect or any implementation of the first aspect, the cluster sparse transformation basis is determined based on the cluster sparse feature of the plurality of beam channel clusters. In this way, a manner of constructing the cluster sparse transformation basis based on a feature of a beam channel cluster is shown in this application as an example.

According to the first aspect or any implementation of the first aspect, the performing a cluster sparse domain transformation on the first CSI transformation information based on a cluster sparse transformation basis includes: performing a cluster sparse domain transformation on a corresponding beam channel cluster based on a cluster sparse transformation basis of each beam channel cluster, to obtain a plurality of pieces of second CSI transformation sub-information, where the second CSI transformation information includes the plurality of pieces of second CSI transformation sub-information. In this way, another manner of constructing the cluster sparse transformation basis based on the feature of the beam channel cluster is shown in this application as an example. In this manner, the transformation basis is constructed for a feature of each beam channel cluster, and a transformation is performed on a single beam channel cluster sequentially, to further improve CSI feedback precision.

According to the first aspect or any implementation of the first aspect, the cluster sparse transformation basis is obtained by performing a cured approximation on the channel prior statistical feature. In this way, by configuring the fixed cluster sparse transformation basis, channel overheads between communication apparatuses can be effectively reduced.

According to the first aspect or any implementation of the first aspect, the performing a cluster sparse domain transformation on the first CSI transformation information based on a cluster sparse transformation basis includes: performing amplitude-phase separation on the N-dimensional beam domain coefficient in the first CSI transformation information, to obtain amplitude information and phase information corresponding to each beam domain coefficient; performing a cluster sparse domain transformation on the amplitude information of each beam domain coefficient in the first CSI transformation information based on the cluster sparse transformation basis, to obtain the second CSI transformation information; and sending, to the second communication apparatus, the quantized values of the L cluster sparse domain coefficients in the N-dimensional cluster sparse domain coefficient and quantized values of phase information corresponding to the L cluster sparse domain coefficients. In this way, amplitude-phase separation is performed on the beam domain coefficient, to separately process the amplitude and phase, that is, a cluster sparse domain transformation is performed on an amplitude coefficient to further improve CSI feedback precision.

According to the first aspect or any implementation of the first aspect, the sending quantized values of L cluster sparse domain coefficients in the N-dimensional cluster sparse domain coefficient to a second communication apparatus includes: sending, to the second communication apparatus, the quantized values of the L cluster sparse domain coefficients and index values corresponding to the L cluster sparse domain coefficients, where the index values are used to indicate positions of the cluster sparse domain coefficients in the N-dimensional cluster sparse domain coefficient. In this way, the first communication apparatus feeds back the quantized value of the cluster sparse domain coefficient and the corresponding index value to the second communication apparatus, so that the second communication apparatus can obtain the N-dimensional cluster sparse domain coefficient based on the quantized value of the sparse domain coefficient and the corresponding index value.

According to the first aspect or any implementation of the first aspect, the method further includes: receiving a first signal sent by the second communication apparatus; and the obtaining CSI information of a channel includes: obtaining the CSI information based on the first signal. In this way, the first communication apparatus can perform CSI estimation based on the first signal, to obtain the CSI information.

According to the first aspect or any implementation of the first aspect, the L cluster sparse domain coefficients are L coefficients with largest modulus values in the N-dimensional cluster sparse domain coefficient. In this way, the L coefficients with the largest modulus values in the N-dimensional cluster sparse domain coefficient can be selected, that is, L cluster sparse domain beam components with greatest intensity are fed back, thereby effectively improving CSI feedback precision. In this way, the L coefficients with the largest modulus values in the N-dimensional cluster sparse domain coefficient can be selected, that is, L cluster sparse domain beam components with greatest intensity are fed back, thereby effectively improving CSI feedback precision.

According to a second aspect, an embodiment of this application provides a CSI information processing method. The method includes: receiving quantized values of L cluster sparse domain coefficients that are sent by a first communication apparatus; performing a cluster sparse domain inverse transformation on the L cluster sparse domain coefficients based on a cluster sparse transformation basis, to obtain first CSI transformation information, where the first CSI transformation information includes an N-dimensional beam domain coefficient, the cluster sparse transformation basis is determined based on a channel prior statistical feature of a channel, N is an integer greater than 1, and L is a positive integer less than N; and performing a beam domain inverse transformation on the first CSI transformation information based on an array response feature, to obtain CSI information, where the CSI information includes an N-dimensional antenna domain coefficient. In this way, a second communication apparatus can obtain, based on the cluster sparse domain coefficient fed back by the first communication apparatus, CSI information with higher precision.

According to the second aspect, the channel prior statistical feature is used to indicate a statistical covariance matrix corresponding to the N-dimensional beam domain coefficient, and the cluster sparse transformation basis is an eigenvector corresponding to the statistical covariance matrix.

According to the second aspect or any implementation of the second aspect, the method further includes: receiving indication information sent by the first communication apparatus, where the indication information is used to indicate the statistical covariance matrix or the eigenvector corresponding to the statistical covariance matrix.

According to the second aspect or any implementation of the second aspect, the statistical covariance matrix is determined based on sample values of a plurality of N-dimensional beam domain coefficients.

According to the second aspect or any implementation of the second aspect, the channel prior statistical feature is used to indicate a cluster sparse feature of a plurality of beam channel clusters corresponding to the N-dimensional beam domain coefficient, and the cluster sparse feature includes at least one of the following: sizes of the beam channel clusters, shapes of the beam channel clusters, and cluster spacings of the beam channel clusters.

According to the second aspect or any implementation of the second aspect, the cluster sparse transformation basis is determined based on the cluster sparse feature of the plurality of beam channel clusters.

According to the second aspect or any implementation of the second aspect, the performing a cluster sparse domain inverse transformation on the L cluster sparse domain coefficients based on a cluster sparse transformation basis includes: performing a cluster sparse inverse transformation on a corresponding beam channel cluster based on a cluster sparse transformation basis of each beam channel cluster, to obtain a plurality of pieces of first CSI transformation sub-information, where the first CSI transformation information includes the plurality of pieces of first CSI transformation sub-information.

According to the second aspect or any implementation of the second aspect, the cluster sparse transformation basis is obtained by performing a cured approximation on the channel prior statistical feature.

According to the second aspect or any implementation of the second aspect, the performing a cluster sparse domain inverse transformation on the L cluster sparse domain coefficients based on a cluster sparse transformation basis includes: receiving quantized values of L cluster sparse domain amplitude coefficients and quantized values of phase information corresponding to N cluster sparse domain coefficients that are sent by the first communication apparatus; performing a cluster sparse domain inverse transformation on the L cluster sparse domain amplitude coefficients based on the cluster sparse transformation basis, to obtain an N-dimensional beam domain amplitude coefficient; and performing amplitude-phase combining on the N-dimensional beam domain amplitude coefficient and the N pieces of phase information, to obtain the first CSI transformation information.

According to the second aspect or any implementation of the second aspect, the method further includes: receiving the quantized values of the L cluster sparse domain coefficients and index values corresponding to the L cluster sparse domain coefficients that are sent by the first communication apparatus, where the index values are used to indicate positions of the cluster sparse domain coefficients in an N-dimensional cluster sparse domain coefficient.

According to the second aspect or any implementation of the second aspect, the method further includes: sending a first signal to the first communication apparatus, to instruct the first communication apparatus to feed back the quantized values of the L cluster sparse domain coefficients based on the first signal.

According to the second aspect or any implementation of the second aspect, the performing a cluster sparse domain inverse transformation on the L cluster sparse domain coefficients based on a cluster sparse transformation basis includes: obtaining second CSI transformation information, where the second CSI transformation information includes an N-dimensional cluster sparse domain coefficient, and the N-dimensional cluster sparse domain coefficient is obtained by padding zeros to the L cluster sparse domain coefficients; and performing a cluster sparse domain inverse transformation on the second CSI transformation information based on the cluster sparse transformation basis, to obtain the first CSI transformation information. In this way, the second communication apparatus can transform the L-dimensional cluster sparse domain coefficient into the N-dimensional cluster sparse domain coefficient in a zero-padding manner, to perform subsequent processing.

According to the second aspect or any implementation of the second aspect, the method further includes: performing single-user or multi-user precoding based on the CSI information. In this way, the second communication apparatus performs user precoding based on the CSI obtained in the solution of this application, so that precoding performance can be effectively improved.

According to a third aspect, an embodiment of this application provides a communication apparatus, where the apparatus includes an obtaining unit, a processing unit, and a transceiver unit, where the obtaining unit may be configured to obtain channel state information CSI information of a channel, where the CSI information includes an N-dimensional antenna domain coefficient, and N is an integer greater than 1; the processing unit is configured to perform a beam domain transformation on the CSI information based on an array response feature, to obtain first CSI transformation information, where the first CSI transformation information includes an N-dimensional beam domain coefficient; the processing unit is further configured to perform a cluster sparse domain transformation on the first CSI transformation information based on a cluster sparse transformation basis, to obtain second CSI transformation information, where the second CSI transformation information includes an N-dimensional cluster sparse domain coefficient and the cluster sparse transformation basis is determined based on a channel prior statistical feature of the channel; and the transceiver unit is configured to send quantized values of L cluster sparse domain coefficients in the N-dimensional cluster sparse domain coefficient to a second communication apparatus, where L is a positive integer less than N.

According to the third aspect, the channel prior statistical feature is used to indicate a statistical covariance matrix corresponding to the N-dimensional beam domain coefficient, and the cluster sparse transformation basis is an eigenvector corresponding to the statistical covariance matrix.

According to the third aspect or any implementation of the third aspect, the transceiver unit is further configured to send indication information to the second communication apparatus, where the indication information is used to indicate the statistical covariance matrix or the eigenvector corresponding to the statistical covariance matrix.

According to the third aspect or any implementation of the third aspect, the statistical covariance matrix is determined based on sample values of a plurality of N-dimensional beam domain coefficients.

According to the third aspect or any implementation of the third aspect, the channel prior statistical feature is used to indicate a cluster sparse feature of a plurality of beam channel clusters corresponding to the N-dimensional beam domain coefficient, and the cluster sparse feature includes at least one of the following: sizes of the beam channel clusters, shapes of the beam channel clusters, and cluster spacings of the beam channel clusters.

According to the third aspect or any implementation of the third aspect, the cluster sparse transformation basis is determined based on the cluster sparse feature of the plurality of beam channel clusters.

According to the third aspect or any implementation of the third aspect, the processing unit is configured to perform a cluster sparse domain transformation on a corresponding beam channel cluster based on a cluster sparse transformation basis of each beam channel cluster, to obtain a plurality of pieces of second CSI transformation sub-information, where the second CSI transformation information includes the plurality of pieces of second CSI transformation sub-information.

According to the third aspect or any implementation of the third aspect, the cluster sparse transformation basis is obtained by performing a cured approximation on the channel prior statistical feature.

According to the third aspect or any implementation of the third aspect, the processing unit is configured to perform amplitude-phase separation on the N-dimensional beam domain coefficient in the first CSI transformation information, to obtain amplitude information and phase information corresponding to each beam domain coefficient; and perform a cluster sparse domain transformation on the amplitude information of each beam domain coefficient in the first CSI transformation information based on the cluster sparse transformation basis, to obtain the second CSI transformation information; and the transceiver unit 303 is configured to send, to the second communication apparatus, the quantized values of the L cluster sparse domain coefficients in the N-dimensional cluster sparse domain coefficient and quantized values of phase information corresponding to the L cluster sparse domain coefficients.

According to the third aspect or any implementation of the third aspect, the transceiver unit is configured to send, to the second communication apparatus, the quantized values of the L cluster sparse domain coefficients and index values corresponding to the L cluster sparse domain coefficients, where the index values are used to indicate positions of the cluster sparse domain coefficients in the N-dimensional cluster sparse domain coefficient.

According to the third aspect or any implementation of the third aspect, the transceiver unit is configured to receive a first signal sent by the second communication apparatus; and the obtaining unit is configured to obtain the CSI information based on the first signal.

According to the third aspect or any implementation of the third aspect, the L cluster sparse domain coefficients are L coefficients with largest modulus values in the N-dimensional cluster sparse domain coefficient.

According to a fourth aspect, an embodiment of this application provides a communication apparatus, including a transceiver unit and a processing unit, where the transceiver unit is configured to receive quantized values of L cluster sparse domain coefficients that are sent by a first communication apparatus; the processing unit is configured to perform a cluster sparse domain inverse transformation on the L cluster sparse domain coefficients based on a cluster sparse transformation basis, to obtain first CSI transformation information, where the first CSI transformation information includes an N-dimensional beam domain coefficient, the cluster sparse transformation basis is determined based on a channel prior statistical feature of a channel, N is an integer greater than 1, and L is a positive integer less than N; and the processing unit 402 is further configured to perform a beam domain inverse transformation on the first CSI transformation information based on an array response feature, to obtain CSI information, where the CSI information includes an N-dimensional antenna domain coefficient.

According to the fourth aspect, the channel prior statistical feature is used to indicate a statistical covariance matrix corresponding to the N-dimensional beam domain coefficient, and the cluster sparse transformation basis is an eigenvector corresponding to the statistical covariance matrix.

According to the fourth aspect or any implementation of the fourth aspect, the transceiver unit is configured to receive indication information sent by the first communication apparatus, where the indication information is used to indicate the statistical covariance matrix or the eigenvector corresponding to the statistical covariance matrix.

According to the fourth aspect or any implementation of the fourth aspect, the statistical covariance matrix is determined based on sample values of a plurality of N-dimensional beam domain coefficients.

According to the fourth aspect or any implementation of the fourth aspect, the channel prior statistical feature is used to indicate a cluster sparse feature of a plurality of beam channel clusters corresponding to the N-dimensional beam domain coefficient, and the cluster sparse feature includes at least one of the following: sizes of the beam channel clusters, shapes of the beam channel clusters, and cluster spacings of the beam channel clusters.

According to the fourth aspect or any implementation of the fourth aspect, the cluster sparse transformation basis is determined based on the cluster sparse feature of the plurality of beam channel clusters.

According to the fourth aspect or any implementation of the fourth aspect, the processing unit is configured to perform a cluster sparse inverse transformation on a corresponding beam channel cluster based on a cluster sparse transformation basis of each beam channel cluster, to obtain a plurality of pieces of first CSI transformation sub-information, where the first CSI transformation information includes the plurality of pieces of first CSI transformation sub-information.

According to the fourth aspect or any implementation of the fourth aspect, the cluster sparse transformation basis is obtained by performing a cured approximation on the channel prior statistical feature.

According to the fourth aspect or any implementation of the fourth aspect, the transceiver unit is configured to receive quantized values of L cluster sparse domain amplitude coefficients and quantized values of phase information corresponding to N cluster sparse domain coefficients that are sent by the first communication apparatus; the processing unit is configured to perform a cluster sparse domain inverse transformation on the L cluster sparse domain amplitude coefficients based on the cluster sparse transformation basis, to obtain an N-dimensional beam domain amplitude coefficient; and the processing unit is configured to perform amplitude-phase combining on the N-dimensional beam domain amplitude coefficient and the N pieces of phase information, to obtain the first CSI transformation information.

According to the fourth aspect or any implementation of the fourth aspect, the transceiver unit is further configured to receive the quantized values of the L cluster sparse domain coefficients and index values corresponding to the L cluster sparse domain coefficients that are sent by the first communication apparatus, where the index values are used to indicate positions of the cluster sparse domain coefficients in an N-dimensional cluster sparse domain coefficient.

According to the fourth aspect or any implementation of the fourth aspect, the transceiver unit is further configured to send a first signal to the first communication apparatus, to instruct the first communication apparatus to feed back the quantized values of the L cluster sparse domain coefficients based on the first signal.

According to the fourth aspect or any implementation of the fourth aspect, the processing unit is configured to obtain second CSI transformation information, where the second CSI transformation information includes an N-dimensional cluster sparse domain coefficient, and the N-dimensional cluster sparse domain coefficient is obtained by padding zeros to the L cluster sparse domain coefficients; and the processing unit is configured to perform a cluster sparse domain inverse transformation on the second CSI transformation information based on the cluster sparse transformation basis, to obtain the first CSI transformation information.

According to the fourth aspect or any implementation of the fourth aspect, the processing unit is further configured to perform single-user or multi-user precoding based on the CSI information.

According to a fifth aspect, an embodiment of this application provides a communication apparatus. The communication apparatus includes a processor and a transceiver, where the processor is configured to obtain channel state information CSI information of a channel, where the CSI information includes an N-dimensional antenna domain coefficient, and N is an integer greater than 1; the processor is further configured to perform a beam domain transformation on the CSI information based on an array response feature, to obtain first CSI transformation information, where the first CSI transformation information includes an N-dimensional beam domain coefficient; the processor is further configured to perform a cluster sparse domain transformation on the first CSI transformation information based on a cluster sparse transformation basis, to obtain second CSI transformation information, where the second CSI transformation information includes an N-dimensional cluster sparse domain coefficient and the cluster sparse transformation basis is determined based on a channel prior statistical feature of the channel; and the transceiver is configured to send quantized values of L cluster sparse domain coefficients in the N-dimensional cluster sparse domain coefficient to a second communication apparatus, where L is a positive integer less than N.

According to the fifth aspect, the channel prior statistical feature is used to indicate a statistical covariance matrix corresponding to the N-dimensional beam domain coefficient, and the cluster sparse transformation basis is an eigenvector corresponding to the statistical covariance matrix.

According to the fifth aspect or any implementation of the fifth aspect, the transceiver is further configured to send indication information to the second communication apparatus, where the indication information is used to indicate the statistical covariance matrix or the eigenvector corresponding to the statistical covariance matrix.

According to the fifth aspect or any implementation of the fifth aspect, the statistical covariance matrix is determined based on sample values of a plurality of N-dimensional beam domain coefficients.

According to the fifth aspect or any implementation of the fifth aspect, the channel prior statistical feature is used to indicate a cluster sparse feature of a plurality of beam channel clusters corresponding to the N-dimensional beam domain coefficient, and the cluster sparse feature includes at least one of the following: sizes of the beam channel clusters, shapes of the beam channel clusters, and cluster spacings of the beam channel clusters.

According to the fifth aspect or any implementation of the fifth aspect, the cluster sparse transformation basis is determined based on the cluster sparse feature of the plurality of beam channel clusters.

According to the fifth aspect or any implementation of the fifth aspect, the processor is further configured to perform a cluster sparse domain transformation on a corresponding beam channel cluster based on a cluster sparse transformation basis of each beam channel cluster, to obtain a plurality of pieces of second CSI transformation sub-information, where the second CSI transformation information includes the plurality of pieces of second CSI transformation sub-information.

According to the fifth aspect or any implementation of the fifth aspect, the cluster sparse transformation basis is obtained by performing a cured approximation on the channel prior statistical feature.

According to the fifth aspect or any implementation of the fifth aspect, the processor is configured to perform amplitude-phase separation on the N-dimensional beam domain coefficient in the first CSI transformation information, to obtain amplitude information and phase information corresponding to each beam domain coefficient; the processor is further configured to perform a cluster sparse domain transformation on the amplitude information of each beam domain coefficient in the first CSI transformation information based on the cluster sparse transformation basis, to obtain the second CSI transformation information; and the transceiver is configured to send, to the second communication apparatus, the quantized values of the L cluster sparse domain coefficients in the N-dimensional cluster sparse domain coefficient and quantized values of phase information corresponding to the L cluster sparse domain coefficients.

According to the fifth aspect or any implementation of the fifth aspect, the transceiver is further configured to send, to the second communication apparatus, the quantized values of the L cluster sparse domain coefficients and index values corresponding to the L cluster sparse domain coefficients, where the index values are used to indicate positions of the cluster sparse domain coefficients in the N-dimensional cluster sparse domain coefficient.

According to the fifth aspect or any implementation of the fifth aspect, the transceiver is configured to receive a first signal sent by the second communication apparatus; and the processor is configured to obtain the CSI information based on the first signal.

According to the fifth aspect or any implementation of the fifth aspect, the L cluster sparse domain coefficients are L coefficients with largest modulus values in the N-dimensional cluster sparse domain coefficient.

According to a sixth aspect, an embodiment of this application provides a communication apparatus. The communication apparatus includes a processor and a transceiver, where the transceiver is configured to receive quantized values of L cluster sparse domain coefficients that are sent by a first communication apparatus; the processor is configured to perform a cluster sparse domain inverse transformation on the L cluster sparse domain coefficients based on a cluster sparse transformation basis, to obtain first CSI transformation information, where the first CSI transformation information includes an N-dimensional beam domain coefficient, the cluster sparse transformation basis is determined based on a channel prior statistical feature of a channel, N is an integer greater than 1, and L is a positive integer less than N; and the processor is configured to perform a beam domain inverse transformation on the first CSI transformation information based on an array response feature, to obtain CSI information, where the CSI information includes an N-dimensional antenna domain coefficient.

According to the sixth aspect, the channel prior statistical feature is used to indicate a statistical covariance matrix corresponding to the N-dimensional beam domain coefficient, and the cluster sparse transformation basis is an eigenvector corresponding to the statistical covariance matrix.

According to the sixth aspect or any implementation of the sixth aspect, the transceiver is further configured to receive indication information sent by the first communication apparatus, where the indication information is used to indicate the statistical covariance matrix or the eigenvector corresponding to the statistical covariance matrix.

According to the sixth aspect or any implementation of the sixth aspect, the statistical covariance matrix is determined based on sample values of a plurality of N-dimensional beam domain coefficients.

According to the sixth aspect or any implementation of the sixth aspect, the channel prior statistical feature is used to indicate a cluster sparse feature of a plurality of beam channel clusters corresponding to the N-dimensional beam domain coefficient, and the cluster sparse feature includes at least one of the following: sizes of the beam channel clusters, shapes of the beam channel clusters, and cluster spacings of the beam channel clusters.

According to the sixth aspect or any implementation of the sixth aspect, the cluster sparse transformation basis is determined based on the cluster sparse feature of the plurality of beam channel clusters.

According to the sixth aspect or any implementation of the sixth aspect, the processor is further configured to perform a cluster sparse inverse transformation on a corresponding beam channel cluster based on a cluster sparse transformation basis of each beam channel cluster, to obtain a plurality of pieces of first CSI transformation sub-information, where the first CSI transformation information includes the plurality of pieces of first CSI transformation sub-information.

According to the sixth aspect or any implementation of the sixth aspect, the cluster sparse transformation basis is obtained by performing a cured approximation on the channel prior statistical feature.

According to the sixth aspect or any implementation of the sixth aspect, the transceiver is configured to receive quantized values of L cluster sparse domain amplitude coefficients and quantized values of phase information corresponding to N cluster sparse domain coefficients that are sent by the first communication apparatus; the processor is configured to perform a cluster sparse domain inverse transformation on the L cluster sparse domain amplitude coefficients based on the cluster sparse transformation basis, to obtain an N-dimensional beam domain amplitude coefficient; and the processor is further configured to perform amplitude-phase combining on the N-dimensional beam domain amplitude coefficient and the N pieces of phase information, to obtain the first CSI transformation information.

According to the sixth aspect or any implementation of the sixth aspect, the transceiver is further configured to receive the quantized values of the L cluster sparse domain coefficients and index values corresponding to the L cluster sparse domain coefficients that are sent by the first communication apparatus, where the index values are used to indicate positions of the cluster sparse domain coefficients in an N-dimensional cluster sparse domain coefficient.

According to the sixth aspect or any implementation of the sixth aspect, the transceiver is configured to send a first signal to the first communication apparatus, to instruct the first communication apparatus to feed back the quantized values of the L cluster sparse domain coefficients based on the first signal.

According to the sixth aspect or any implementation of the sixth aspect, the processor is further configured to obtain second CSI transformation information, where the second CSI transformation information includes an N-dimensional cluster sparse domain coefficient, and the N-dimensional cluster sparse domain coefficient is obtained by padding zeros to the L cluster sparse domain coefficients; and the processor is configured to perform a cluster sparse domain inverse transformation on the second CSI transformation information based on the cluster sparse transformation basis, to obtain the first CSI transformation information.

According to the sixth aspect or any implementation of the sixth aspect, the processor is further configured to perform single-user or multi-user precoding based on the CSI information.

According to a seventh aspect, an embodiment of this application further provides a computer-readable storage medium. The medium includes a computer program, and when the computer program is run on an apparatus, the apparatus is enabled to perform the CSI information processing method according to any one of the first aspect or implementations of the first aspect.

According to an eighth aspect, an embodiment of this application provides a computer-readable storage medium. The medium includes a computer program, and when the computer program is run on an apparatus, the apparatus is enabled to perform the CSI information processing method according to any one of the second aspect or implementations of the second aspect.

According to a ninth aspect, an embodiment of this application provides a computer program, where the computer program is used to perform the CSI information processing method according to any one of the first aspect or implementations of the first aspect.

According to a tenth aspect, an embodiment of this application provides a computer program, where the computer program is used to perform the CSI information processing method according to any one of the second aspect or implementations of the second aspect.

According to an eleventh aspect, an embodiment of this application further provides a computer program product including executable instructions, where when the computer program product is run, some or all of the steps of the method in any one of the first aspect and possible implementations of the first aspect are performed.

According to a twelfth aspect, an embodiment of this application further provides a computer program product including executable instructions, where when the computer program product is run, some or all of the steps of the method in any one of the second aspect and possible implementations of the second aspect are performed.

According to a thirteenth aspect, an embodiment of this application provides a chip, where the chip includes at least one processing circuit and an interface, where the interface and the processing circuit communicate with each other by using an internal connection path, and the processing circuit performs the method according to any one of the first aspect or possible implementations of the first aspect, to control the interface to receive or send a signal.

According to a fourteenth aspect, an embodiment of this application provides a chip, where the chip includes at least one processing circuit and an interface, where the interface and the processing circuit communicate with each other by using an internal connection path, and the processing circuit performs the method according to any one of the second aspect or possible implementations of the second aspect, to control the interface to receive or send a signal.

According to a fifteenth aspect, an embodiment of this application provides a communication system, where the communication system includes the first communication apparatus according to any one of the first aspect and implementations of the first aspect and the second communication apparatus according to any one of the second aspect and implementations of the second aspect.

According to a sixteenth aspect, an embodiment of this application provides a communication apparatus, including at least one processor configured to execute program instructions stored in a memory, where when the program instructions are executed by the processor, the apparatus is enabled to perform the method shown in any one of the first aspect and possible implementations of the first aspect in the embodiments of this application, or the apparatus is enabled to perform the method shown in any one of the second aspect and possible implementations of the second aspect in the embodiments of this application. Optionally, the memory is located outside the communication apparatus, or the memory is included in the communication apparatus. Optionally, the memory and the processor are integrated.

BRIEF DESCRIPTION OF THE DRAWINGS

To describe the technical solutions in embodiments of this application more clearly, the following briefly describes the accompanying drawings for describing embodiments of this application. It is clear that the accompanying drawings in the following description show merely some embodiments of this application, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and the like are intended to distinguish between different objects but do not indicate a particular order of the objects. For example, a first target object and a second target object are used to distinguish between different target objects, but not intended to describe a specific order of the target objects.

In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In the descriptions of the embodiments of this application, unless otherwise stated, "a plurality of" means two or more than two. For example, a plurality of processing units refer to two or more processing units, and a plurality of systems refer to two or more systems.

In the description of the embodiments of this application, mathematical symbols that may be used and descriptions thereof are shown in Table 1.

TABLE 1

| Mathematical symbol | Description |
|---|---|
| $H^H$ | Complex conjugate transpose of a matrix H |
| $\|R\|$ | Determinant of a positive-definite Hermitian matrix R |
| $R^{-1}$ | Inverse of the matrix R |
| $\|\|h\|\|$ | Modulus value of a vector h |
| $[h]_n$ | $n^{th}$ element of the vector h |
| $[H]_{n,m}$ | Element in an $n^{th}$ row and an $m^{th}$ column of the matrix H |
| $I_N$ | N-dimensional unit matrix |
| $0_N$ | N-dimensional all-zero column vector |
| $1_N$ | N-dimensional all-one column vector |
| $p_1 * p_2$ | Convolution of sequences $p_1$ and $p_2$ |
| Re(h) | Real part of a complex scalar quantity h |
| Im(h) | Imaginary part of the complex scalar quantity h |
| arctan(•) | Arc-tangent function |

Figure 1:
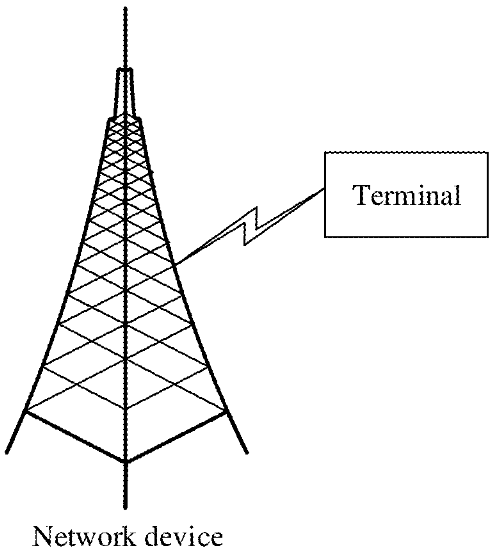
FIG. 1 is a schematic diagram illustrating a communication system.

Before the technical solutions in the embodiments of this application are described, a communication system in the embodiments of this application is first described with reference to the accompanying drawings. FIG. 1 is a schematic diagram of a communication system according to an embodiment of this application. The communication system includes a network device and a terminal. It should be noted that in an actual application, there may be one or more network devices and terminals. The quantity of network devices and the quantity of terminals in the communication system shown in FIG. 1 are merely adaptive examples. This is not limited in this application.

The communication system may be configured to support a fourth generation (4G) access technology, for example, a long term evolution (LTE) access technology. Alternatively, the communication system may support a fifth generation (5G) access technology, such as a new radio (NR) access technology, and future mobile communication systems.

The network device in FIG. 1 may be configured to support terminal access, for example, may be an evolved NodeB (evolutional NodeB, eNB, or eNodeB) in LTE, or a base station in a 5G network or a future evolved public land mobile network (PLMN), a broadband network service gateway (BNG), an aggregation switch, or a non-Third Generation Partnership Project (3GPP) access device. Optionally, the network device in this embodiment of this application may include base stations in various forms, for example, a macro base station, a micro base station (also referred to as a small cell), a relay station, an access point, a 5G base station, a future base station, a satellite, a transmission point (transmitting and receiving point, TRP), a transmission point (transmitting point, TP), a mobile switching center, or a device that undertakes a function of a base station in device-to-device (D2D), vehicle-to-everything (V2X), or machine-to-machine (M2M) communication. This is not specifically limited in this embodiment of this application. For ease of description, in all the embodiments of this application, all the foregoing apparatuses that provide a wireless communication function for the terminal are referred to as a network device or a base station or a BS.

The terminal in FIG. 1 may be a device that provides voice or data connectivity for a user, for example, may also be referred to as a mobile station, user equipment (UE), a subscriber unit, a station, or terminal equipment (TE). The terminal may be a cellular phone, a personal digital assistant (PDA), a wireless modem, a handheld device, a laptop computer, a cordless phone, a wireless local loop (WLL) station, a tablet (pad), or the like. With development of wireless communication technologies, a device that can access the communication system, communicate with a network side of the communication system, or communicate with another object by using the communication system may be the terminal in this embodiment of this application, for example, a terminal and a vehicle in intelligent transportation, a household appliance in a smart home, a power meter reading instrument in a smart grid, a voltage monitoring instrument, an environment monitoring instrument, a video surveillance device in a smart security network, or a cash register. In this embodiment of this application, the terminal may communicate with a network device, for example, the network device in FIG. 1. A plurality of terminals may also communicate with each other. The terminal may be statically fixed or mobile.

Figure 2A:
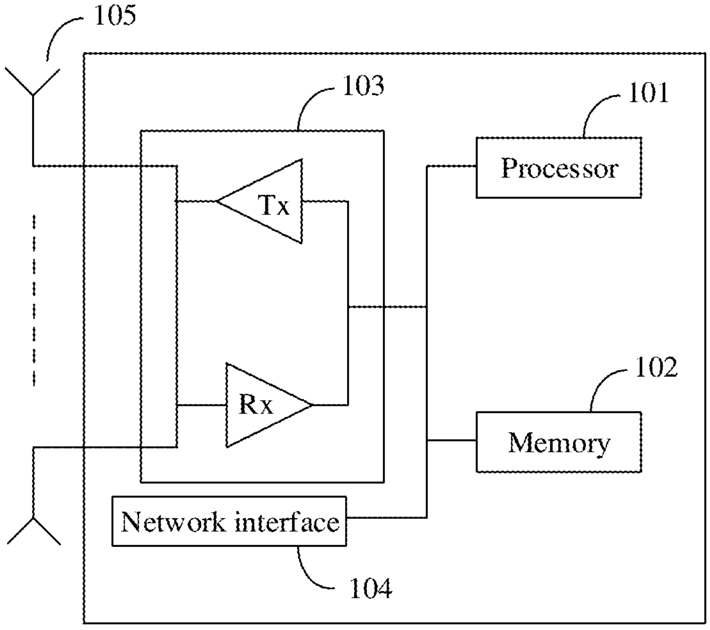
FIG. 2*a* is a schematic diagram illustrating a structure of a network device.

FIG. 2*a* is a schematic diagram of a structure of a network device. In FIG. 2*a*, the network device includes at least one processor 101, at least one transceiver 103, and one or more antennas 105, and may further include a memory 102 and a network interface 104. The processor 101, the memory 102, the transceiver 103, and the network interface 104 are connected, for example, by using a bus. The antenna 105 is connected to the transceiver 103. The network interface 104 is configured to connect the network device to another communication device by using a communication link. In this embodiment of this application, the connection may include various interfaces, transmission lines, buses, or the like. This is not limited in this embodiment.

The processor in this embodiment of this application, for example, the processor 101, may include at least one of the following types: a general purpose central processing unit (CPU), a digital signal processor (DSP), a microprocessor, an application-specific integrated circuit (ASIC), a microcontroller unit (MCU), a field programmable gate array (FPGA), or an integrated circuit configured to implement a logic operation. For example, the processor 101 may be a single-core (single-CPU) processor or a multi-core (multi-CPU) processor. The at least one processor 101 may be integrated in one chip or located on a plurality of different chips.

The memory in this embodiment of this application, for example, the memory 102, may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium capable of carrying or storing desired program code in a form of an instruction or a data structure and capable of being accessed by a computer. This is not limited.

The memory 102 may exist independently, and is connected to the processor 101. Optionally, the memory 102 may also be integrated with the processor 101, for example, integrated into one chip. The memory 102 can store program code for executing the technical solution in this embodiment of this application, and the processor 101 controls execution. Various types of computer program code executed may also be considered as a driver of the processor 101. For example, the processor 101 is configured to execute the computer program code stored in the memory 102, to implement the technical solution in this embodiment of this application. Optionally, the memory 102 may be further located out of the chip and connected to the processor 101 by using an interface.

The transceiver 103 may be configured to support receiving or sending of a radio frequency signal between the access network device and the terminal. The transceiver 103 may be connected to the antenna 105. The transceiver 103 includes a transmitter Tx and a receiver Rx. Specifically, one or more antennas 105 may receive a radio frequency signal. The receiver Rx of the transceiver 103 is configured to receive the radio frequency signal from the antenna, convert the radio frequency signal into a digital baseband signal or digital intermediate frequency signal, and provide the digital baseband signal or the digital intermediate frequency signal to the processor 101, so that the processor 101 performs further processing, for example, demodulation processing and decoding processing, on the digital baseband signal or the digital intermediate frequency signal. In addition, the transmitter Tx in the transceiver 103 is further configured to receive a modulated digital baseband signal or digital intermediate frequency signal from the processor 101, convert the modulated digital baseband signal or digital intermediate frequency signal into a radio frequency signal, and send the radio frequency signal by using the one or more antennas 105. Specifically, the receiver Rx may selectively perform one-stage or multi-stage downmixing processing and analog-to-digital conversion processing on the radio frequency signal to obtain the digital baseband signal or the digital intermediate frequency signal, and an order of downmixing processing and analog-to-digital conversion processing is adjustable. The transmitter Tx may selectively perform one-stage or multi-stage upmixing processing and digital-to-analog conversion processing on the modulated digital baseband signal or digital intermediate frequency signal to obtain the radio frequency signal, and an order of upmixing processing and digital-to-analog conversion processing is adjustable. The digital baseband signal and the digital intermediate frequency signal may be collectively referred to as a digital signal.

Figure 2B:
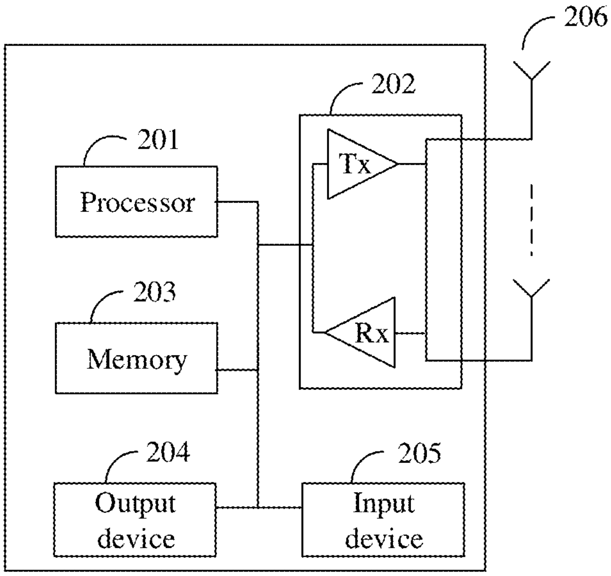
FIG. 2*b* is a schematic diagram illustrating a structure of a terminal.

FIG. 2*b* is a schematic diagram of a structure of a terminal. In FIG. 2*b*, the terminal includes at least one processor 201, at least one transceiver 202, and at least one memory 203. The processor 201, the memory 203, and the transceiver 202 are connected to each other. Optionally, the terminal may further include an output device 204, an input device 205, and one or more antennas 206. The antenna 206 is connected to the transceiver 202. The output device 204 and the input device 205 are connected to the processor 201.

With reference to related descriptions in FIG. 2*a*, the transceiver 202, the memory 203, and the antenna 206 may implement similar functions.

The processor 201 may be a baseband processor, or may be a CPU. The baseband processor and the CPU may be integrated or separated.

The processor 201 may be configured to implement various functions for the terminal, for example, configured to process a communication protocol and communication data, or configured to control an entire terminal device, execute a software program, and process data of the software program; or configured to assist in completing a computation processing task, for example, graphic image processing or audio processing; or the processor 201 is configured to implement one or more of the foregoing functions.

The output device 204 communicates with the processor 201, and may display information in a plurality of manners.

The memory 203 may exist independently, and is connected to the processor 201. Optionally, the memory 203 may also be integrated with the processor 201, for example, integrated into one chip. The memory 203 can store program code for executing the technical solution in this embodiment of this application, and the processor 201 controls execution. Various types of computer program code executed may also be considered as a driver of the processor 201. For example, the processor 201 is configured to execute the computer program code stored in the memory 203, to implement the technical solution in this embodiment of this application. Optionally, the memory 203 may be further located out of the chip and connected to the processor 201 by using an interface.

With reference to FIG. 1, the following briefly describes the background technology that may be used, to help a person skilled in the art better understand the technical solutions of this application.

Massive multiple-input multiple-output (Massive-MIMO) is an important technical means for a wireless communication system to increase a system capacity and improve spectral efficiency. Its basic principle is that a network device determines an effective transmission space of a channel by using a singular value decomposition (SVD) decomposition method based on CSI information fed back by a terminal. There are a plurality of mutually orthogonal or approximately orthogonal parallel subchannels in the transmission space, and a plurality of independent data streams are transmitted in these parallel subchannels to obtain a space division multiplexing gain with an exponential capacity increase.

Therefore, a critical condition for obtaining a space division multiplexing gain by using the technology is that the network device can obtain sufficiently accurate CSI information. To improve CSI feedback precision, a typical CSI feedback technology is as follows: The terminal quantizes the obtained CSI information according to a predefined CSI codebook, and feeds back the quantized CSI information to the network device through a reverse link; and the network device performs direct or indirect CSI reconstruction based on a feedback value, and performs single-user or multi-user precoding based on the reconstructed CSI (hereinafter referred to as a CSI reconstruction value).

However, when precoding by the network device is enabled in the foregoing CSI feedback technology, signaling overheads of the reverse link are introduced. Generally, if a quantity of antennas of the network device is larger, information (for example, a space domain feature) contained in the CSI information is richer, and corresponding feedback overheads are also higher. However, with development of communication technologies, a quantity of antennas in the massive-MIMO technology continuously increases, and a feedback amount increases exponentially with the quantity of antennas. Therefore, a more effective CSI feedback technology is required.

Figure 3:
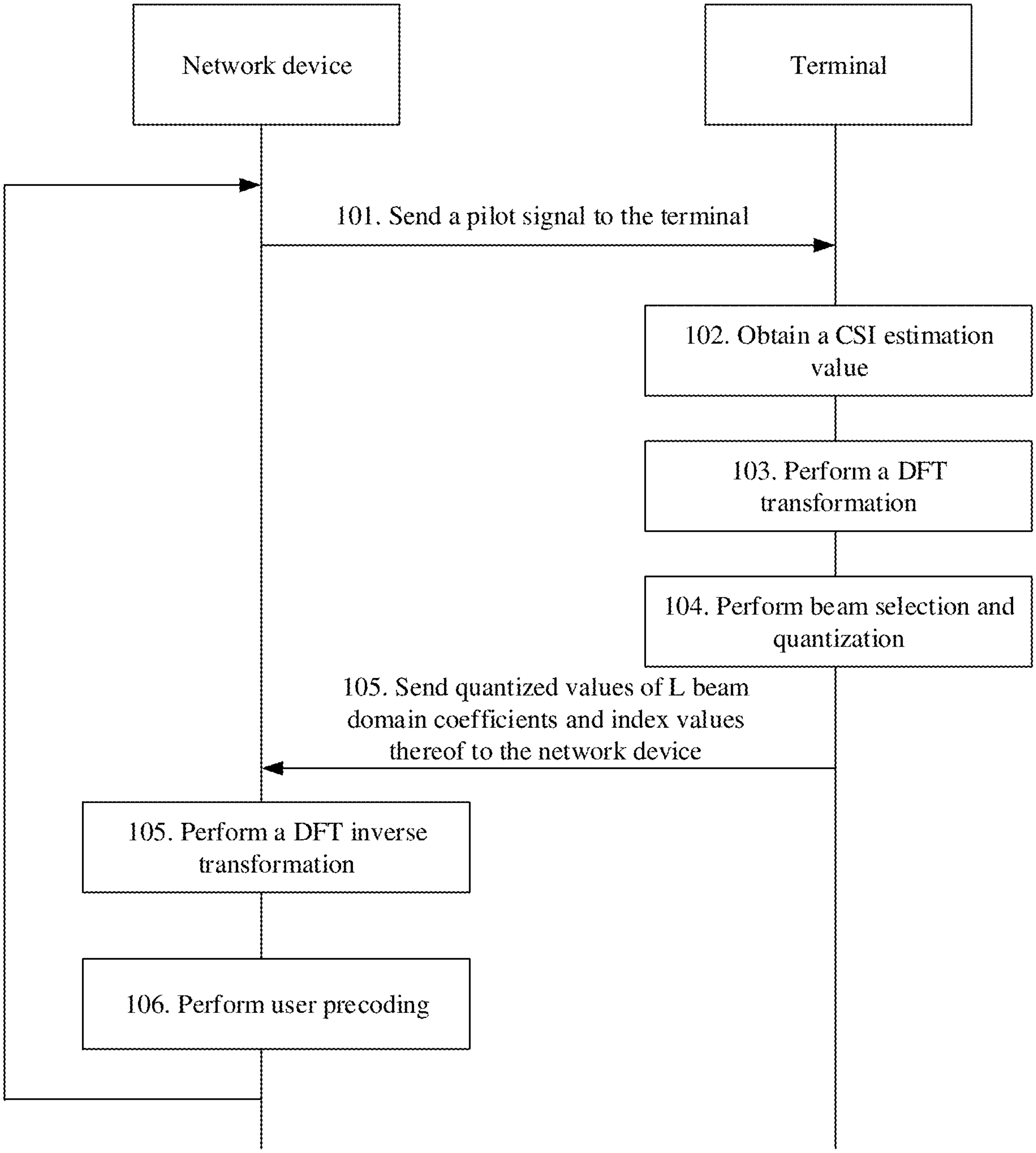
FIG. 3 is a schematic interaction diagram illustrating a CSI feedback method.

For example, FIG. 3 illustrates a CSI feedback technology.

S101. A network device sends a pilot signal to a terminal; and correspondingly, the terminal receives the pilot signal sent by the network device.

For example, the network device sends the pilot signal to the terminal by using an air interface resource.

S102. The terminal obtains a CSI estimation value.

For example, in response to the received pilot signal, the terminal performs CSI estimation to obtain the CSI estimation value. It should be noted that the CSI estimation value is not a real CSI value. For ease of expression, the CSI information is used in this specification to represent the CSI estimation value. Details are not described again hereinafter.

It should be noted that in the description of this embodiment of this application, an example is used for description, where in the example, the network device has N antennas, the terminal has one antenna, and correspondingly, the CSI information is an N-dimensional vector. The N-dimensional vector includes N antenna domain coefficients. N indicates a quantity of antennas of the network device. In another embodiment, this application may also be applied to a scenario in which the terminal has M antennas. Correspondingly, the CSI information is an N*M-dimensional matrix.

S103. The terminal performs a DFT transformation.

Figure 4A:
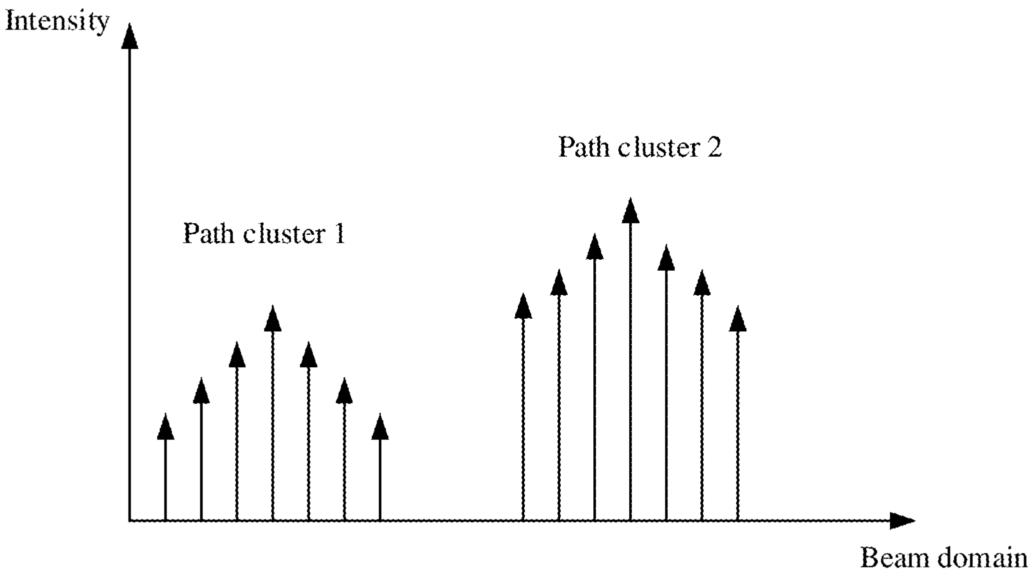
FIG. 4*a* is a schematic diagram illustrating beam domain coefficients.

For example, the terminal performs a DFT transformation on the CSI information to obtain an N-dimensional beam domain coefficient, which may also be understood as a transformation domain coefficient corresponding to N DFT beams. FIG. 4*a* is a schematic diagram of an N-dimensional beam domain coefficient. A vertical axis indicates intensity, and a horizontal axis indicates a beam domain. Referring to FIG. 4*a*, each coefficient in the N-dimensional beam domain coefficient corresponds to one beam component in FIG. 4*a*. Unless otherwise specified, the beam component in this specification is a beam component in DFT domain. It should be noted that, because a difference between values of beam domain coefficients is relatively large, a beam component corresponding to a beam domain coefficient with a relatively small value is not shown in the figure. It may also be understood that energy of a beam component that is not shown is relatively low. For example, the CSI information includes a 64-dimensional beam domain coefficient. In other words, FIG. 4*a* should include beam components corresponding to 64 beam domain coefficients. However, because energy intensity varies, only beam components with relatively high energy, that is, beam components corresponding to 14 beam domain coefficients in the 64-dimensional beam domain coefficient, are shown in FIG. 4*a*. It should be further noted that, distribution of beam domain coefficients has a path cluster feature, and may include one or more path clusters. As shown in FIG. 4*a*, the path cluster may include a plurality of relatively large and dense beam components, for example, a path cluster 1 and a path cluster 2 in FIG. 4*a*.

As described above, as the quantity of antennas increases, the CSI feedback amount also increases, resulting in an increase of feedback overheads. Therefore, in the conventional technology, before feedback, a terminal performs beam selection to reduce feedback overheads.

S104. The terminal performs beam selection and quantization.

Figure 4B:
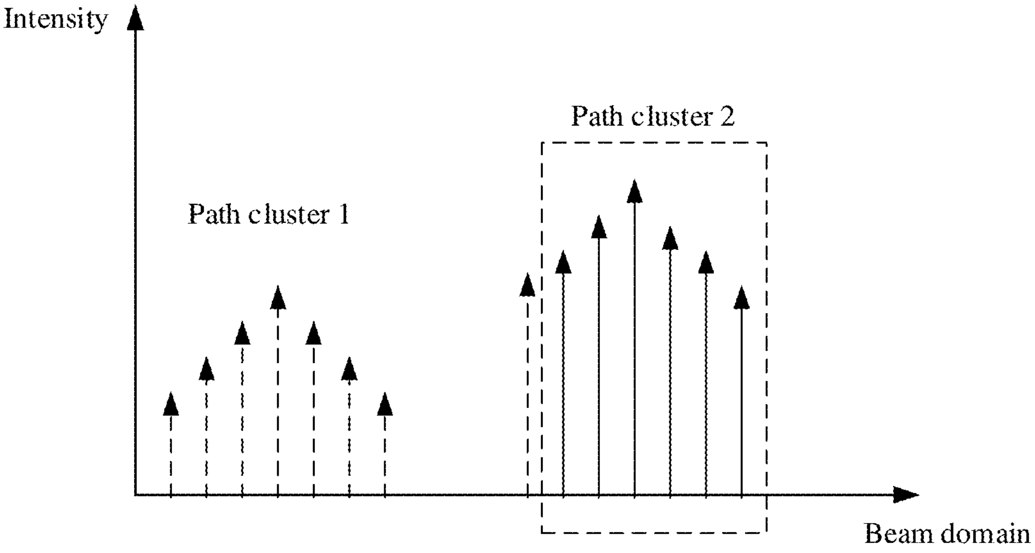
FIG. 4*b* is a schematic diagram illustrating beam selection.

Specifically, in the process in which the terminal performs beam selection and quantization, for example, the terminal selects beam domain coefficients corresponding to L strong beams for quantization, where the beam domain coefficients corresponding to the L strong beams are L coefficients with largest modulus values in the N-dimensional beam domain coefficient. For example, FIG. 4*b* shows a result obtained after the terminal performs beam selection on a basis of FIG. 4*a*. Referring to FIG. 4*b*, six beam components corresponding to a dashed-line box (that is, solid-line beam components shown in the figure) are beam domain coefficients corresponding to the selected L strong beams. To be specific, the terminal selects only six effective beam components with highest energy in the path cluster 2 for feedback, but does not feed back any beam component in the path cluster 1 or one beam component (that is, a dashed-line beam component shown in the figure) in the path cluster 2.

S105. The terminal sends L beam domain coefficients and corresponding index values to the network device; and correspondingly, the network device receives the L beam domain coefficients and the corresponding index values that are sent by the terminal.

The terminal sends the quantized L beam domain coefficients and the corresponding index values to the network device by using a feedback channel. The index values are positions of the L beam domain coefficients in the N-dimensional beam domain coefficient.

S106. The network device performs a DFT inverse transformation.

Specifically, the network device performs a DFT inverse transformation on the L beam domain coefficients in response to the received quantized values of the L beam domain coefficients and the index values thereof, to obtain a CSI reconstruction value, where the CSI reconstruction value also includes an N-dimensional antenna domain coefficient. Specifically, the network device searches for corresponding L DFT transformation vectors (referred to as DFT transformation bases in this specification) by using L index values, multiplies the L beam domain coefficients by the corresponding DFT transformation bases, and then performs other processing, for example, linear combination (for specific processing details, refer to the conventional technology, and details are not described in this specification), where a combination result is the CSI reconstruction value.

S107. The network device performs user precoding.

Specifically, the network device performs single-user or multi-user precoding based on the CSI reconstruction value. For example, the network device may transmit data and/or a pilot signal based on a precoding result. It should be noted that FIG. 3 and FIG. 5 and FIG. 6 in the following descriptions show only a CSI information processing procedure. It can be learned from the figure that the CSI information processing procedure is actually a closed-loop procedure, and may be triggered periodically or conditionally. This is not limited in this application. For specific triggering, refer to specifications in the existing standard. However, for a data link, the network device may transmit data to a single user or a plurality of users based on a precoding result. Details are not described again hereinafter.

Figure 4C:
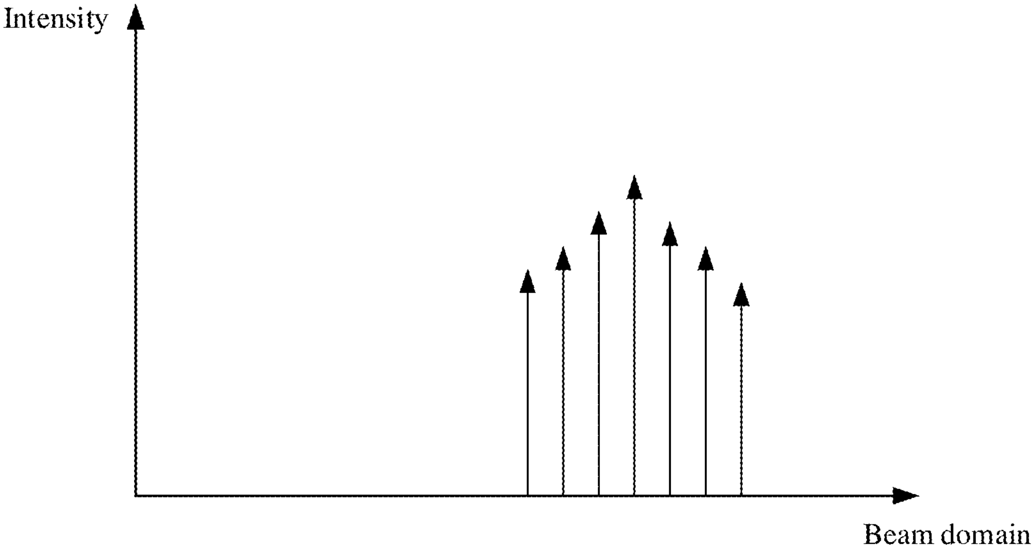
FIG. 4*c* is a schematic diagram illustrating CSI reconstruction.

FIG. 4*c* shows a CSI reconstruction value restored on a basis of FIG. 4*b*. Referring to FIG. 4*c*, because a CSI feedback amount decreases, the network device can restore only the path cluster 2 in FIG. 4*a* based on the obtained CSI reconstruction value. As a result, the CSI information received by the network device is missing, and further, a precoding performance loss is caused.

This application provides a CSI information processing manner, to improve CSI feedback precision while reducing overheads. The following describes a specific implementation solution of this application with reference to the schematic diagram of an application scenario shown in FIG. 1. It should be noted that, in the description of the embodiments of this application, an application scenario of a downlink wireless communication system in which a first communication apparatus is a terminal and a second communication apparatus is a network device is used as an example for description. Actually, the technical solutions of this application may be further applied to an uplink wireless communication system in which a first communication apparatus is a network device and a second communication apparatus is a terminal. In other words, the network device determines CSI information and feeds back the CSI information to the terminal. Specific implementation details are similar to those in this application. Details are not described again in this application.

Figure 5:
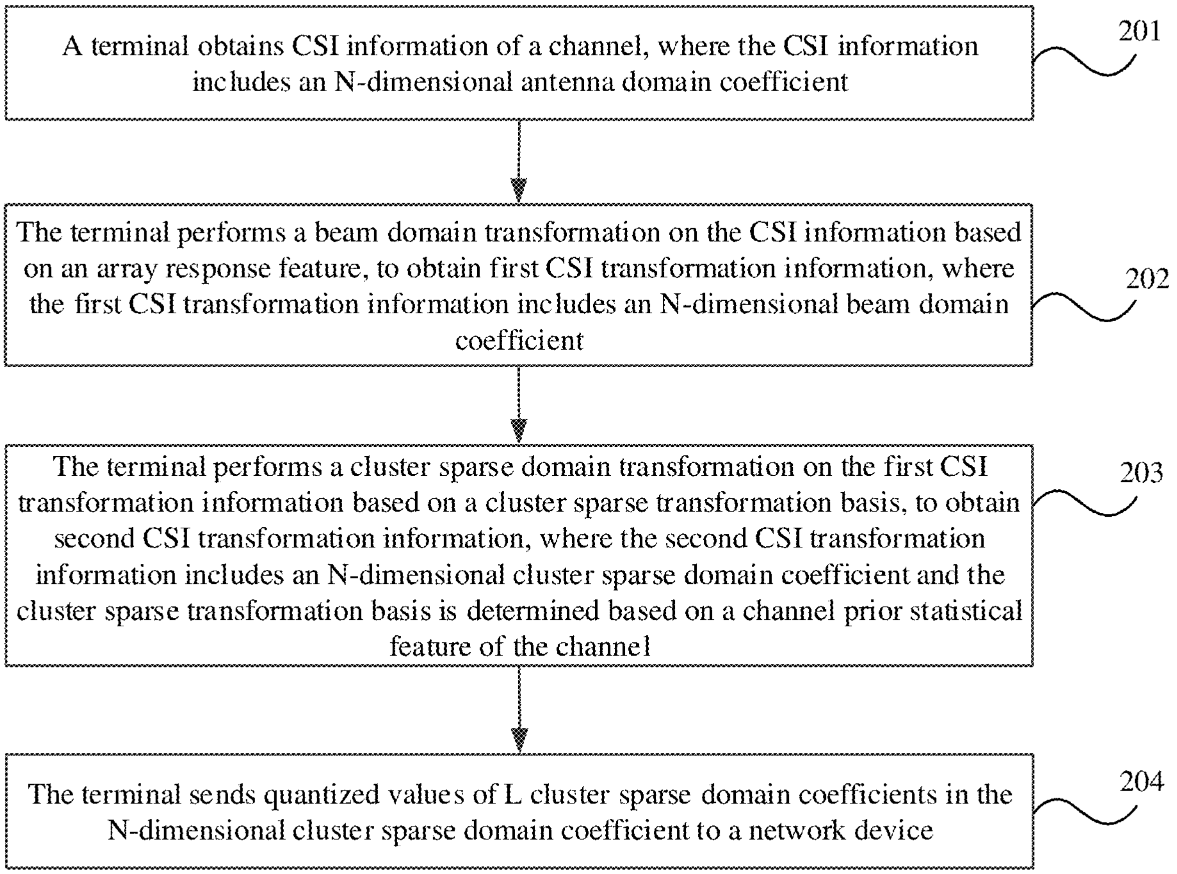
FIG. 5 is a schematic flowchart of a CSI information processing method on a terminal side according to an embodiment of this application.

With reference to FIG. 1, FIG. 5 is a schematic flowchart of a CSI information processing method on a terminal side according to an embodiment of this application. In FIG. 5, S201. A terminal obtains CSI information of a channel, where the CSI information includes an N-dimensional antenna domain coefficient.

Specifically, the terminal performs channel estimation in response to a received pilot signal sent by a network device, to obtain the CSI information of the channel. The CSI information includes the N-dimensional antenna domain coefficient, N is a quantity of antennas of the network device, and N is an integer greater than 1. Optionally, a value of N is sent by the network device to the terminal in advance by using signaling.

For example, for ease of expression, the CSI information is denoted as h in this application, and its dimension is $N*1$.

S202. The terminal performs a beam domain transformation on the CSI information based on an array response feature, to obtain first CSI transformation information, where the first CSI transformation information includes an N-dimensional beam domain coefficient.

Specifically, in this application, the terminal may perform the beam domain transformation on the CSI information based on the array response feature, to obtain the N-dimensional beam domain coefficient. The array response feature is used to describe an array form of the N-dimensional antenna domain coefficient.

For example, in this application, when the array form is a uniform linear array, an example in which a corresponding beam domain transformation basis is a DFT transformation basis is used for description. The DFT transformation basis may be understood as a special form of the array response feature. In another embodiment, different array forms may correspond to different transformation bases (that is, beam domain transformation bases), for example, a transformation basis corresponding to a coprime array and based on a coprime array steering vector. This is not limited in this application.

For example, that the terminal performs a beam domain transformation (which may also be referred to as a DFT transformation) on the CSI information based on a DFT transformation basis may be expressed as:

$$\hat{h}=Q^H\hat{h} \quad (1)$$

where Q represents the DFT transformation basis and is specifically an N*N matrix, and $\hat{h}$ represents the first CSI transformation information, that is, the N-dimensional beam domain coefficient obtained after the DFT transformation is performed.

S203. The terminal performs a cluster sparse domain transformation on the first CSI transformation information based on a cluster sparse transformation basis, to obtain second CSI transformation information, where the second CSI transformation information includes an N-dimensional cluster sparse domain coefficient and the cluster sparse transformation basis is determined based on a channel prior statistical feature of the channel.

Specifically, the terminal may perform a cluster sparse domain transformation on the N-dimensional beam domain coefficient based on the cluster sparse transformation basis, to obtain the N-dimensional cluster sparse domain coefficient, that is, the second CSI information, to further compress the N-dimensional beam domain coefficient to a cluster sparse domain. Therefore, a more effective channel dimension reduction effect is achieved.

For example, that the terminal performs a cluster sparse domain transformation on the N-dimensional beam domain coefficient (that is, first CSI information) based on the cluster sparse transformation basis may be expressed as:

$$\hat{h}=P^H\hat{h} \quad (2)$$

where P represents the cluster sparse transformation basis and is specifically an N×Ñ-dimensional matrix, and Ñ≤N·$\hat{h}$ represents the second CSI transformation information, that is, the N-dimensional cluster sparse domain coefficient obtained after the cluster sparse transformation is performed.

Specifically, in this application, the cluster sparse transformation basis is determined based on the channel prior statistical feature of the channel. In an example, a representation of the channel prior statistical feature is a statistical covariance matrix of the channel, and the terminal may determine the corresponding cluster sparse transformation basis based on the statistical covariance matrix of the channel. For a specific manner, refer to a manner 1 in the following descriptions.

In another example, a representation of the channel prior statistical feature is approximate to a statistical covariance. For example, because calculation of the statistical covariance matrix is complex, in this embodiment of this application, a cluster sparse feature of a beam channel cluster may be used as the prior statistical feature of the channel, to construct the cluster sparse transformation basis. For a specific manner, refer to a manner 2 in the following descriptions. It should be noted that the beam channel cluster is the path cluster shown in FIG. 4*a*.

In the foregoing two manners, construction of the cluster sparse transformation basis has a slow time-varying feature, that is, the network device and the terminal need to perform signaling interaction, so that the network device and the terminal configure a same cluster sparse transformation basis, but this manner also increases signaling overheads. In another example, the terminal may perform a cured approximation on the channel prior statistical feature, to obtain a fixed cluster sparse transformation basis, thereby further reducing signaling overheads of the network device and the terminal. For a specific manner, refer to a manner 3 in the following descriptions.

S204. The terminal sends quantized values of L cluster sparse domain coefficients in the N-dimensional cluster sparse domain coefficient to the network device.

Specifically, the terminal selects the L cluster sparse domain coefficients from the obtained N-dimensional cluster sparse domain coefficient to perform quantization, and sends the quantized L coefficients to the network device, where L is a positive integer less than N. It should be noted that, for a specific manner of quantizing the cluster sparse domain coefficients, reference may be made to the conventional technology. This is not limited in this application. Optionally, the L cluster sparse domain coefficients may be L coefficients with largest modulus values in the N-dimensional cluster sparse domain coefficient.

For example, for ease of expression, the L cluster sparse domain coefficients may be expressed as h L, which is specifically an L-dimensional vector (L-dimensional column vector), and the quantized L coefficients are expressed as, which is an L-dimensional vector.

Figure 6:
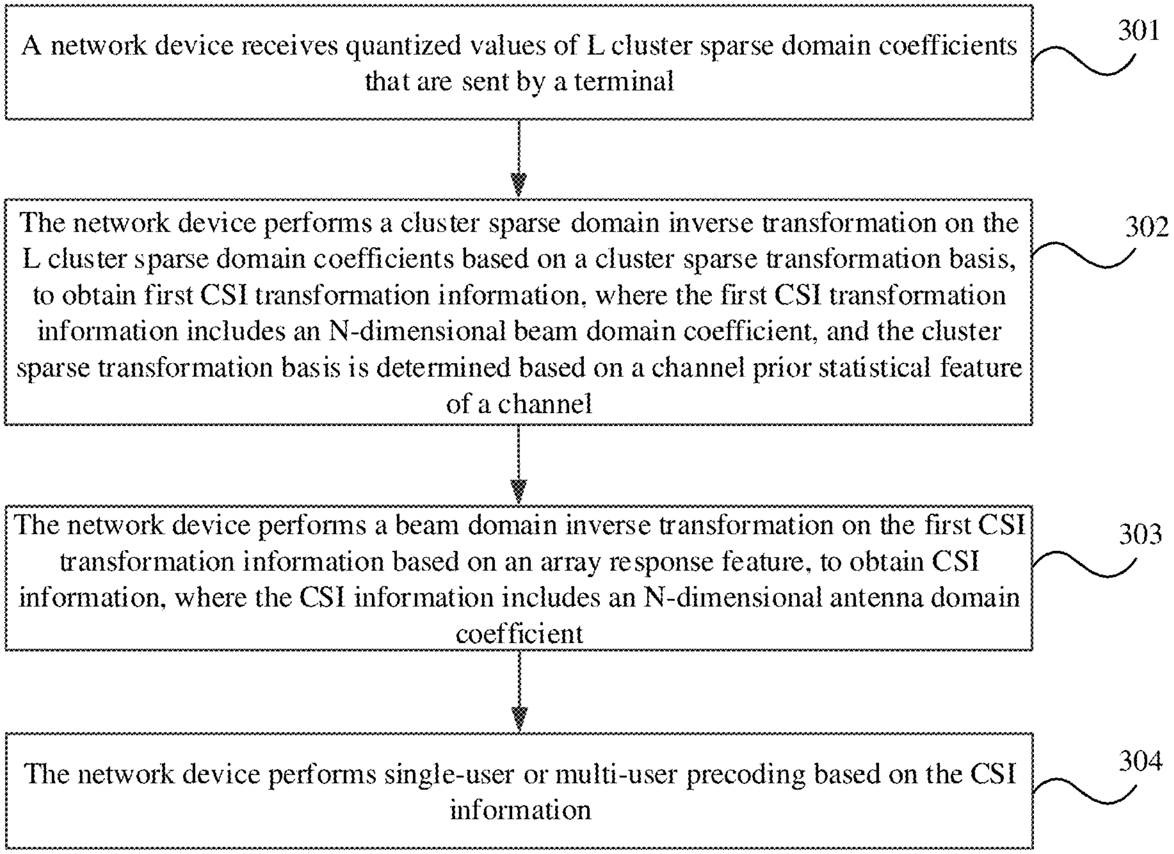
FIG. 6 is a schematic flowchart of a CSI information processing method on a network device side according to an embodiment of this application.

Optionally, the terminal further sends index information to the network device, where the index information includes index values corresponding to the L cluster sparse domain coefficients, and the index values are used to indicate positions of beam components corresponding to the cluster sparse domain coefficients in the cluster sparse domain. For example, the index information may be expressed as n, which is specifically an L-dimensional vector, including L index values. A $k^{th}$ element (or coefficient) $n_k$ in the vector n represents a sequence number index of a beam component in the $k^{th}$ cluster sparse domain in the N-dimensional cluster sparse domain coefficient With reference to FIG. 1, FIG. 6 is a schematic flowchart on a network device side according to an embodiment of this application. It should be noted that, unless otherwise specified, for meanings of parameters related to the network device side, reference may be made to related descriptions of the terminal. Details are not described herein again.

S301. A network device receives quantized values of L cluster sparse domain coefficients that are sent by a terminal.

Specifically, the network device sends a pilot signal to the terminal, where the pilot signal may be used to instruct the terminal to perform channel estimation based on the pilot signal, to feed back CSI information (specifically, the L cluster sparse domain coefficients described above). The network device may receive a quantized value of an L-dimensional cluster sparse domain coefficient $\hat{h}_L$ fed back by the terminal.

Optionally, the network device may pad zeros to the received L-dimensional cluster sparse domain coefficient $\hat{h}_L$, to extend the L-dimensional cluster sparse domain coefficient $\hat{h}_L$ to an N-dimensional vector, to obtain an N-dimensional cluster sparse domain coefficient, which may be expressed as $\tilde{h}$. For example, a specific extension manner is as follows:

$$\tilde{h} = 0_N \quad (3)$$

$$[\tilde{h}]_{n_k} = [\hat{h}_L]_k$$

In the foregoing formula, $0_N$ represents an N-dimensional all-zero vector, and $n_k$ represents a $k^{th}$ element in n (that is, index information, and for a concept, refer to the foregoing description).

S302. The network device performs a cluster sparse domain inverse transformation on the L cluster sparse domain coefficients based on a cluster sparse transformation basis, to obtain first CSI transformation information, where the first CSI transformation information includes an N-dimensional beam domain coefficient, and the cluster sparse transformation basis is determined based on a channel prior statistical feature of a channel.

Specifically, the network device may obtain the cluster sparse transformation basis in advance. In an example, if the cluster sparse transformation basis has a slow time-varying feature, the network device may receive in advance the cluster sparse transformation basis sent by the terminal. Then the network device performs the cluster sparse domain inverse transformation on the received L cluster sparse domain coefficients based on the current cluster sparse transformation basis, to obtain the N-dimensional beam domain coefficient. For example, if the network device pads zeros to the L cluster sparse domain coefficients in S201 to obtain the N-dimensional cluster sparse domain transformation, the cluster sparse domain inverse transformation performed by the network device on the N-dimensional cluster sparse domain coefficient may be expressed as:

$$\tilde{h}=P\tilde{h} \tag{4}$$

where $\tilde{h}$ represents the N-dimensional beam domain coefficient obtained after the cluster sparse domain inverse transformation, that is, the first CSI transformation information. It should be noted that because of a feedback error, an error may exist between information obtained by the terminal side and the first CSI transformation information (that is, the N-dimensional beam domain coefficient) obtained by the network device and second CSI transformation information (that is, the N-dimensional cluster sparse domain coefficient) and CSI information (that is, an N-dimensional antenna domain coefficient) in the following descriptions. For ease of expression, the first CSI transformation information (that is, the N-dimensional beam domain coefficient), the second CSI transformation information (that is, the N-dimensional cluster sparse domain coefficient), and the CSI information (that is, the N-dimensional antenna domain coefficient) are still used on the network device side to indicate a correspondence between the information obtained by the network device side and the information obtained by the terminal side.

In a possible implementation, alternatively, the network device may not pad zeros to the L-dimensional cluster sparse domain coefficient $\hat{h}_L$. In another embodiment, the N-dimensional beam domain coefficient $\tilde{h}$ may be further obtained in another equivalent manner. For example, the network device may perform a cluster sparse domain inverse transformation on the L-dimensional cluster sparse domain coefficient $\hat{h}_L$ based on an N×L-dimensional cluster sparse transformation basis, to obtain the N-dimensional beam domain coefficient h, which may be specifically expressed as:

$$\tilde{h}=\tilde{P}\hat{h}_L,\tilde{P}=(P_{n_1} \ldots P_{n_k} \ldots P_{n_L}) \tag{5}$$

where $p_n$ represents an $n^{th}$ column vector of a cluster sparse transformation basis P, and $\tilde{P}$ represents an N×L-dimensional cluster sparse transformation basis obtained by splicing L N-dimensional column vectors by column.

S303. The network device performs a beam domain inverse transformation on the first CSI transformation information based on an array response feature, to obtain the CSI information, where the CSI information includes the N-dimensional antenna domain coefficient.

For example, a DFT transformation basis is still used as an example. The network device performs a DFT inverse transformation on the N-dimensional beam domain coefficient (that is, the first CSI transformation information) based on the DFT transformation basis, to obtain the CSI information, which may also be referred to as a CSI reconstruction value. The CSI information includes the N-dimensional antenna domain coefficient.

It should be noted that, in S202 and S203, both the cluster sparse transformation basis and the array response feature (for example, the DFT transformation basis) used by the network device correspond to those on the terminal side. To be specific, if the terminal performs a cluster sparse domain transformation by using a cluster sparse transformation basis P1, the network device side needs to perform a cluster sparse domain inverse transformation based on the cluster sparse transformation basis P1.

S304. The network device performs single-user or multi-user precoding based on the CSI information.

For example, precoding of a multiple-transmit single-receive channel or a single-user single stream may be expressed as:

$$\tilde{x}=wx,w=\tilde{h} \tag{6}$$

where w represents a precoding weight (N-dimensional column vector), x represents a single-stream data symbol, and $\tilde{x}$ represents a precoded symbol vector that can be mapped to an N-dimensional transmit antenna port.

For example, an example of zero-forcing (ZF) precoding of a multiple-transmit single-receive channel or a multiple-user per-user single stream is as follows:

$$\tilde{x} = W\begin{bmatrix} X_1 \\ \cdots \\ x_{N_u} \end{bmatrix}, \left\langle W = H^H\left(HH^H\right)^{-1}, H = \begin{bmatrix} \tilde{\tilde{h}}_1^H \\ \cdots \\ \tilde{\tilde{h}}_{N_u}^H \end{bmatrix} \right\rangle \tag{7}$$

where $N_u$ represents a total quantity of space division multiplexing users, $\tilde{h}$ represents a CSI reconstruction value (N-dimensional row vector) corresponding to a multiple-transmit single-receive channel, H represents an $N_u$×N-dimensional equivalent channel matrix obtained by splicing $N_u$ row vectors by row, W represents an N×$N_u$-dimensional ZF precoding weight corresponding to the equivalent channel H, $x_n$ represents a single-stream data symbol of an $n^{th}$ user, and $\tilde{x}$ represents a multi-user precoded symbol vector that can be mapped to an N-dimensional transmit antenna port.

Optionally, the network device may transmit data to a single user or a plurality of users based on a precoding result. Optionally, the network device may further transmit a pilot signal to the single user or the plurality of users based on the precoding result, that is, repeatedly perform S201.

In a possible implementation, to further improve CSI feedback precision, the terminal may perform amplitude-phase separation on each coefficient in the N-dimensional beam domain coefficient, and perform a cluster sparse domain transformation only on an amplitude coefficient (hereinafter referred to as an N-dimensional beam domain amplitude coefficient) in the N-dimensional beam domain coefficient. For example, the terminal may perform amplitude-phase separation on the result obtained in S202, that is, the N-dimensional beam domain coefficient $\hat{h}$, which may be expressed as:

$$[a]_n = \|\hat{h}_n\|,\ [\varphi]_n = \arctan\left(\mathrm{Re}(\hat{h}_n) \Big/ \mathrm{Im}(\hat{h}_n)\right) \tag{8}$$

where a represents an N-dimensional modulus value vector (that is, the N-dimensional beam domain amplitude coefficient described above) formed by a modulus value of each element in the N-dimensional beam domain coefficient $$\hat{h}[\varphi]_n$$

represents a complex phase angle (that is, phase information) of an $n^{th}$ element in $\hat{h}$.

For example, a is used as an input of the formula (2), that is, the terminal performs a cluster sparse domain transformation based on the N-dimensional beam domain amplitude coefficient, to obtain an N-dimensional cluster sparse domain amplitude coefficient.

For example, the terminal sends quantized values of L coefficients in the N-dimensional cluster sparse domain amplitude coefficient to the network device. For details, refer to the foregoing description. Details are not described herein again. In an example, the terminal may send the quantized value of $\varphi_n$, that is, N-dimensional phase information, to the network device. In another example, the terminal may send, to the network device, phase information corresponding to M beam domain amplitude coefficients whose beam components are relatively large in the N-dimensional beam domain amplitude coefficient, where M is an integer less than N and greater than or equal to L.

For example, on the network device side, after receiving L cluster sparse domain amplitude coefficients, the network device may perform a cluster sparse domain inverse transformation based on the foregoing manner, to obtain the N-dimensional cluster sparse domain amplitude coefficient. Then the network device may perform amplitude-phase combining on the N-dimensional cluster sparse domain amplitude coefficient and the received quantized value of the phase information, to obtain the N-dimensional beam domain coefficient, and then perform subsequent processing on the N-dimensional beam domain coefficient. For details, refer to the foregoing description.

Figure 7:
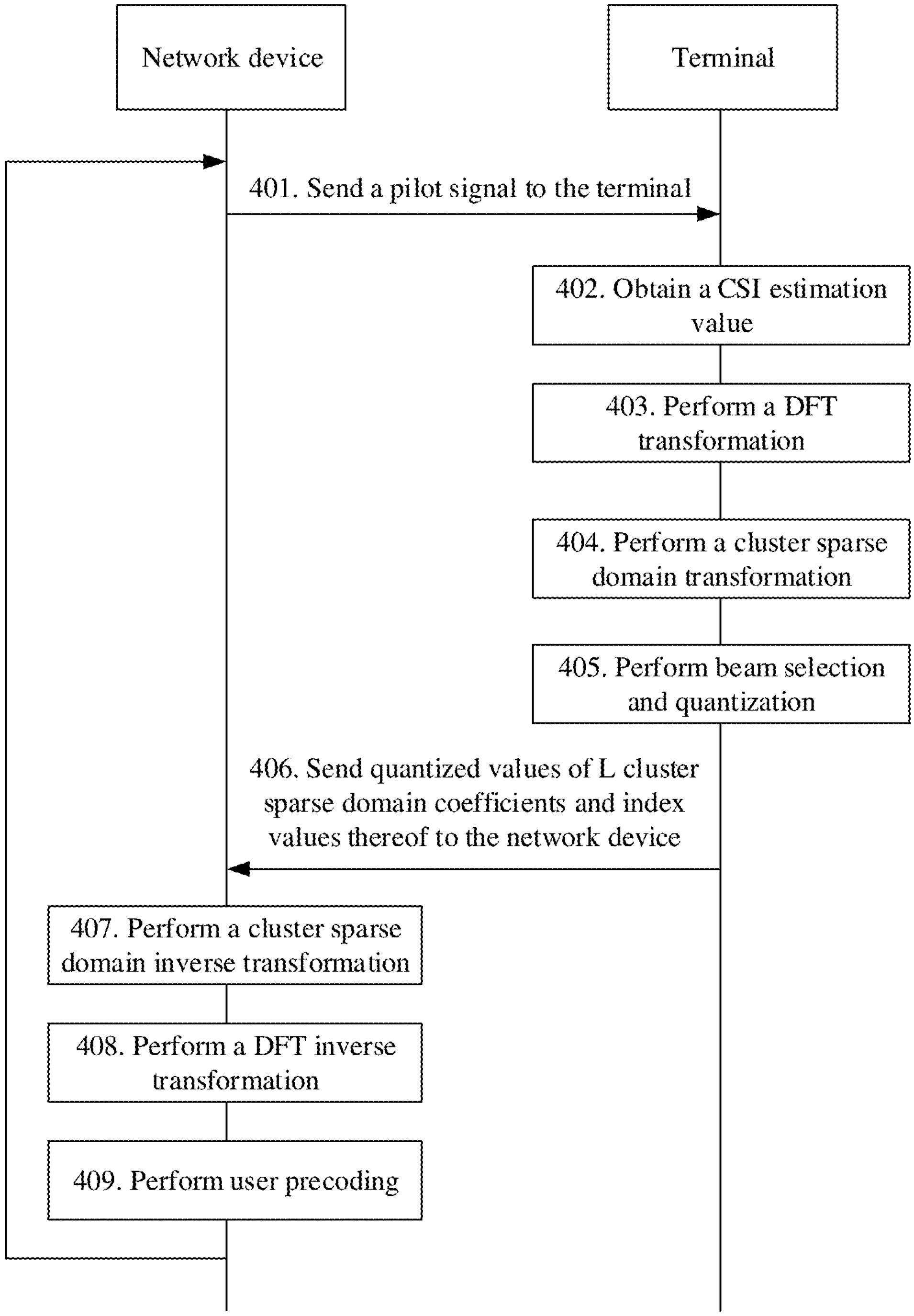
FIG. 7 is a schematic interaction diagram of a CSI information processing method on a network device side according to an embodiment of this application.

It should be noted that, in the foregoing description, procedures on the terminal side and the network device side are separately used for description. Actually, a schematic flowchart for performing steps of the technical solutions of this application in a communication system including a terminal and a network device is shown in FIG. 7. In FIG. 7, S401. A network device sends a pilot signal to a terminal; and the terminal receives the pilot signal sent by the network device.

S402. The terminal obtains a CSI estimation value.

S403. The terminal performs a DFT transformation.

S404. The terminal performs a beam domain transformation.

S405. The terminal performs beam selection and quantization.

S406. The terminal sends quantized values of L cluster sparse domain coefficients and index values thereof to the network device; and the network device receives the quantized values of the L cluster sparse domain coefficients and the index values thereof that are sent by the terminal.

S407. The network device performs a cluster sparse domain inverse transformation.

S408. The network device performs a DFT inverse transformation.

S409. The network device performs user precoding.

When sending a pilot signal next time, the network device may generate the pilot signal based on the current precoding result, and send the pilot signal to the terminal. In other words, the foregoing process is repeated, to update the CSI feedback information. For specific details, refer to the foregoing description. Details are not described herein again.

Figure 4D:
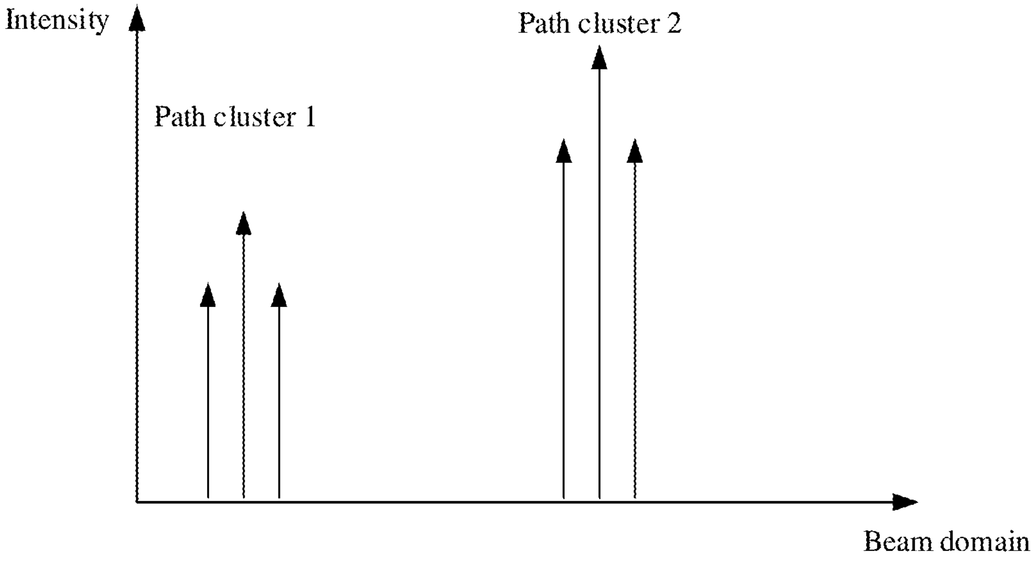
FIG. 4*d* is a schematic diagram illustrating cluster sparse domain coefficients.
Figure 4E:
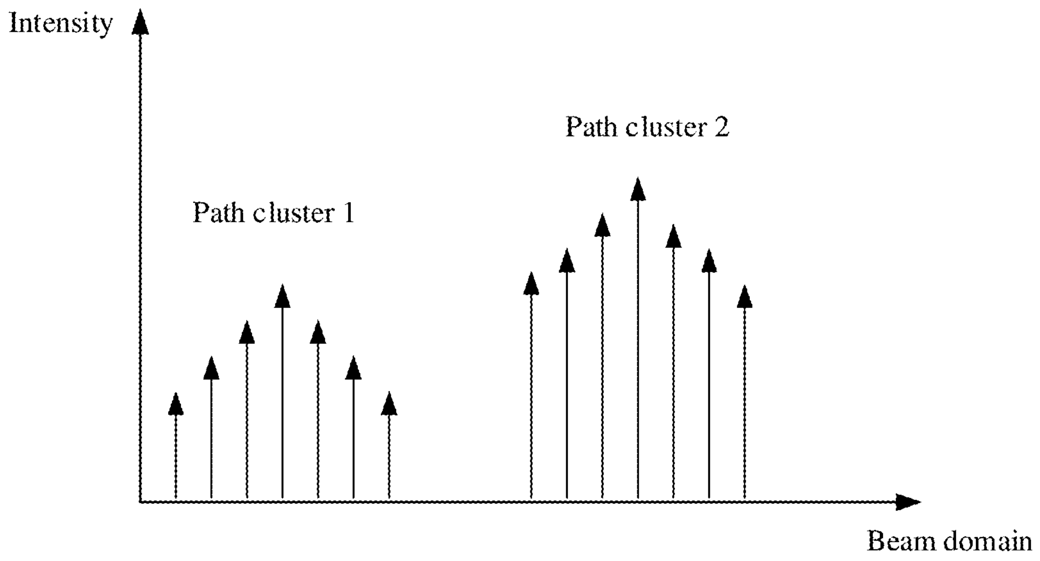
FIG. 4*e* is a schematic diagram illustrating CSI reconstruction.

To better describe the technical effects of the technical solutions of this application, the following provides comparative descriptions with reference to the schematic diagrams shown in FIG. 4*a* to FIG. 4*c*. For example, in S202, the terminal performs a DFT transformation on the N-dimensional antenna domain coefficient (still assuming that N is 64), to obtain the N-dimensional beam domain coefficient. For the result, still refer to FIG. 4*a*, that is, 14 effective beam components are included, where the effective beam components are beam components corresponding to the beam domain coefficients whose values are relatively large in the foregoing description. Further, in S203, the terminal performs a cluster sparse domain transformation on the N-dimensional beam domain coefficient to obtain the N-dimensional cluster sparse domain coefficient. FIG. 4*d* is a schematic diagram of a cluster sparse domain. Referring to FIG. 4*d*, a quantity of effective beams corresponding to the N-dimensional cluster sparse domain coefficient is smaller than that corresponding to the N-dimensional beam domain coefficient, but an amount of information included in the effective beams remains unchanged. It should be noted that energy values and the quantity of beam components obtained after the cluster sparse domain transformation as shown in FIG. 4*d* are merely examples, and are not limited in this application. In this application, because the terminal further compresses the beam domain coefficients, so that the dimension of the beam domain coefficients is reduced to the cluster sparse domain, that is, a quantity of effective beam components decreases but the amount of information remains unchanged. Therefore, given that coefficients corresponding to L=6 beam components are fed back, the terminal in this application can feed back, to the network device, cluster sparse domain coefficients corresponding to the six effective beam components in FIG. 4*d*. FIG. 4*e* is a schematic diagram of a result obtained after a cluster sparse domain inverse transformation and a DFT inverse transformation are performed on the network device side. Referring to FIG. 4*e*, a CSI reconstruction value obtained by the network device side is closer to an original CSI estimation value (that is, CSI information) on the terminal side. Therefore, it can be learned that, in this application, based on the cluster sparse transformation basis, the CSI estimation value obtained after the DFT transformation is further transformed to further compress the beam components thereof, thereby improving CSI feedback precision while reducing overheads.

The following describes in detail different manners of constructing the cluster sparse transformation basis mentioned above.

Manner 1

Specifically, the terminal may obtain a statistical covariance matrix R corresponding to the N-dimensional beam domain coefficient, perform eigendecomposition on the statistical covariance matrix R to obtain an eigenvector U of the statistical covariance R, and use the eigenvector U as a cluster sparse transformation basis. For example, matrix the eigenvector U (that is, the cluster sparse transformation basis) is an N*N-dimensional matrix, that is, Ñ=N.

In a possible implementation, the statistical covariance matrix R is determined by using $N_S$ sample values of the N-dimensional beam domain coefficient. For example, the statistical covariance matrix may be expressed as:

$$R = N_s^{-1}\sum_{n=1}^{N}\hat{\hat{h}}_n\hat{\hat{h}}_n^H \tag{9}$$

The sample value is a historical N-dimensional beam domain coefficient obtained by the terminal.

Optionally, the terminal may send the statistical covariance matrix R or the eigenvector U to the network device. If the network device receives the statistical covariance matrix R, the network device performs eigendecomposition on the statistical covariance matrix R to obtain the eigenvector U (that is, the cluster sparse transformation basis) of the statistical covariance matrix R As described above, the statistical covariance matrix R and the eigenvector U have a slow time-varying feature, that is, change with movement of the terminal. Therefore, the terminal needs to send an updated statistical covariance matrix or eigenvector U to the network device, or may periodically report the current statistical covariance matrix R or eigenvector U to the network device.

In a possible implementation, to further reduce signaling overheads, the terminal and the network device may prestore several groups of typical eigenvectors U, that is, the cluster sparse transformation basis. In an example, the terminal may still obtain the eigenvector U of the statistical covariance matrix R in the foregoing manner, to use the eigenvector as the cluster sparse transformation basis, and match the obtained cluster sparse transformation basis with the prestored cluster sparse transformation basis, to send identification information of the successfully matched cluster sparse transformation basis, for example, a storage sequence number, to the network device. The network device may find the corresponding cluster sparse transformation basis based on the identification information. In another example, the terminal may separately perform a cluster sparse domain transformation on the N-dimensional beam domain coefficient based on several prestored groups of typical cluster sparse transformation bases, and compare a plurality of transformed N-dimensional cluster sparse domain coefficients. The terminal sends, to the network device, identification information of a cluster sparse domain transformation basis corresponding to a largest N-dimensional cluster sparse domain coefficient.

Manner 2

Specifically, the channel prior statistical feature is used to indicate a cluster sparse feature of a plurality of beam channel clusters corresponding to the N-dimensional beam domain coefficient, and the cluster sparse feature includes at least one of the following: sizes of the beam channel clusters, shapes of the beam channel clusters, and cluster spacings of the beam channel clusters.

In a possible implementation, the cluster sparse transformation basis is determined based on the cluster sparse feature of the plurality of beam channel clusters. For example, it is assumed that the shapes of the beam channel clusters may be expressed as an $N_0$-dimensional vector $P_0$ (for example, the beam channel clusters may be a plurality of triangular beam channel clusters in the beam domain, as shown in FIG. 4*a*), and a spacing between beam channel clusters is M, and $N-N_0$ can be exactly divided by M. In this case, the cluster sparse transformation basis P may be obtained by uniformly shifting $P_0$ by equal spacings, that is, P has $$\tilde{N} = \frac{N - N_0}{M} + 1$$

column vectors, and a $n^{th}$ column vector is obtained by shifting $P_0$ by (n−1)M in an N-dimensional length, where n is an integer greater than or equal to 1.

The cluster sparse transformation basis described above is formed by features of the plurality of beam channel clusters. In another possible implementation, the terminal may determine a corresponding cluster sparse transformation basis for a feature of each beam channel cluster, and perform a cluster sparse domain transformation on the corresponding beam channel cluster based on the determined cluster sparse transformation basis. For example, the terminal may determine, based on a feature such as a shape of the path cluster 1, a first cluster sparse transformation basis corresponding to the path cluster 1, and determine, based on a shape feature of the path cluster 2, a second cluster sparse transformation basis corresponding to the path cluster 2. The terminal performs a cluster sparse domain transformation on the path cluster 1 based on the first cluster sparse transformation basis, and performs a cluster sparse domain transformation on the path cluster 2 based on the second cluster sparse transformation basis. Optionally, the first cluster sparse transformation base is the same as or different from the second cluster sparse transformation basis. The first cluster sparse transformation basis and the second cluster sparse transformation basis may also be understood as formed based on vectors corresponding to a plurality of window functions. For example, the first cluster sparse transformation basis and the second cluster sparse transformation basis are both formed based on a vector corresponding to a rectangular window function, a vector corresponding to a triangular window function, and a vector corresponding to a parabolic window function. In this case, the first cluster sparse transformation basis and the second cluster sparse transformation basis are X*3-dimensional matrices, where X depends on a window function length. Correspondingly, using the path cluster 1 as an example, the terminal may obtain three effective beam components in the cluster sparse domain after performing the cluster sparse domain transformation on the path cluster 1 based on the first cluster sparse transformation basis, and similarly, may obtain three effective beam components corresponding to the path cluster 2 in the cluster sparse domain. During feedback, the terminal may separately select, from the path cluster 1 and the path cluster 2, a cluster sparse domain coefficient corresponding to a beam component with greatest intensity for feedback. Optionally, in addition to the quantized value of the cluster sparse domain coefficient, the information fed back by the terminal further needs to include a quantity of beam channel clusters (channel clusters in the beam domain), position information of the beam channel clusters, a cluster sparse domain transformation basis corresponding to each beam channel cluster, and an index value of the cluster sparse domain coefficient that is fed back, so that the network device can perform, based on the cluster sparse transformation basis of each beam channel cluster, a cluster sparse domain inverse transformation on a corresponding beam channel cluster, to obtain the N-dimensional beam domain coefficient. For example, in this embodiment, the index value represents a sequence number index of the cluster sparse domain coefficient in a cluster sparse domain coefficient corresponding to a cluster sparse domain path cluster to which the cluster sparse domain coefficient belongs. For example, the position information of the beam channel cluster includes at least one of the following: a center point of the beam channel cluster, a left start point of the beam channel cluster, and a right start point of the beam channel cluster.

Figure 8:
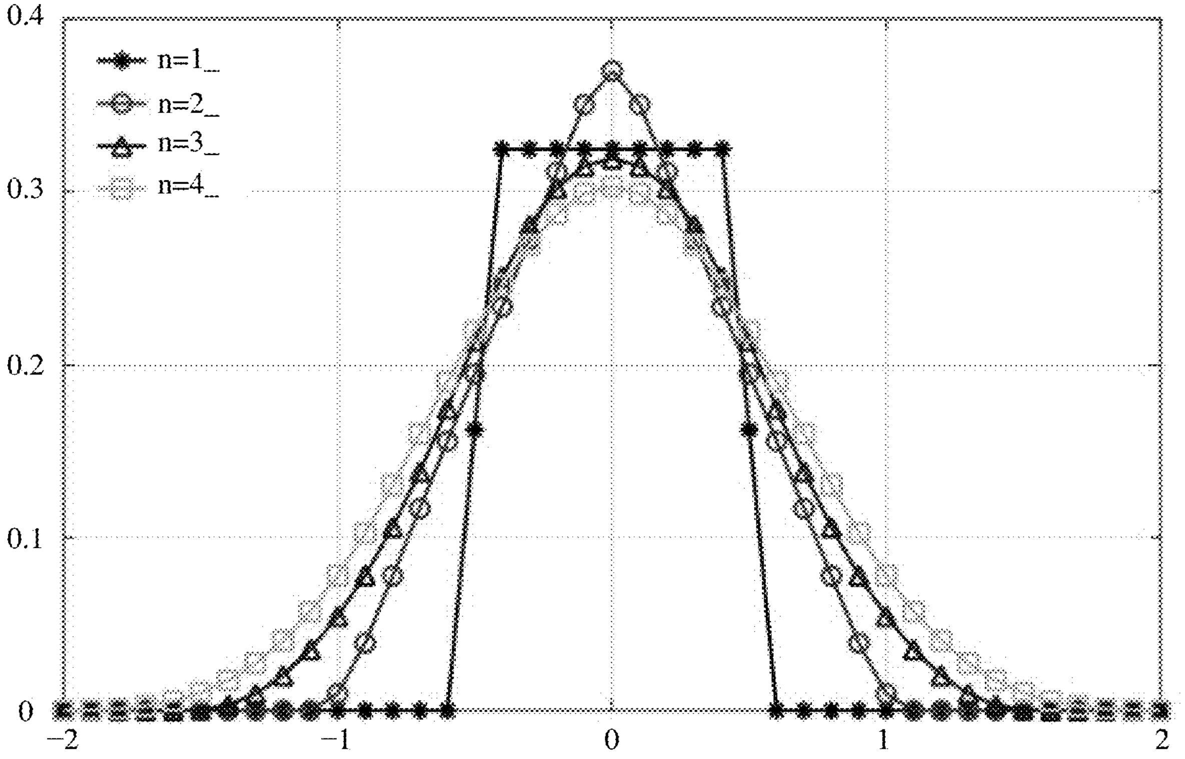
FIG. 8 is a schematic diagram illustrating a window function set.

For example, a process of constructing a corresponding cluster sparse transformation basis may be expressed as:

$$[p_1]_n = \begin{cases} 1, & -N_0 < m < N_0 \\ 0.5, & m = \pm N_0 \\ 0, & \text{others} \end{cases}, \quad p_i = \frac{p_1}{\|p_1\|} \tag{10}$$

$$p_{n+1} = \frac{p_n * p_1}{\|p_n * p_1\|}$$

where $p_n$ corresponds to an $n^{th}$ vector in the cluster sparse transformation basis, $P_n{*}P_l$, represents a result obtained after convolution of $P_n$ and $P_l$, and then obtained through construction by using an iterative method of modulus value normalization, and a window function set when n is 1 to 4 is shown in FIG. 8.

Manner 3

Figure 9:
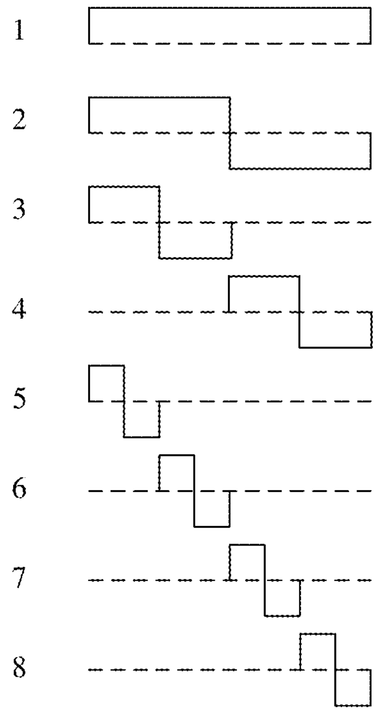
FIG. 9 is a schematic diagram illustrating construction of a cluster sparse transformation basis.

Specifically, the terminal may perform a cured approximation on the channel prior statistical feature of the beam domain coefficient, to construct an N*N-dimensional cluster sparse transformation basis, that is, Ñ=N. For example, a correlation distribution pattern of a multi-cycle rectangular window may be used as a cluster sparse transformation basis, and a construction manner is as follows:

A first basis vector is an all-one vector and corresponds to a full correlation pattern, as shown in FIG. 9, that is, $P_l = +1_N$, where $1_N$ represents an N-dimensional all-one vector. It should be noted that in FIG. 9, only N=8 is used as an example for description. This is not limited in this application.

Assuming n=1, a $2^{-1}$N-dimensional all-one vector $+1_{2^{-1}N}$ is generated. In this case, a second basis vector $P_2$ is formed by splicing $+1_{2^{-1}N}$ and an inverse value thereof and is expressed as $$[+1_{2^{-1}N} \ \ -1_{2^{-1}N}].$$

Assuming n=2, there are $2^2$ corresponding basis vectors.

A first relative bias vector is formed by splicing a $2^{-1}$ N-dimensional vector $$[+1_{2^{-1}N} \ \ -1_{2^{-1}N}]$$

and a $2^{-1}$ N-dimensional all-zero vector.

A second relative bias vector is obtained by cyclically shifting the first relative bias vector by a value of $2^{-1}$ N.

A third relative bias vector is obtained by cyclically shifting the second relative bias vector by a value of $2^{-1}$ N.

A fourth relative bias vector is obtained by cyclically shifting the third relative bias vector by a value of $2^{-1}$ N.

For the remaining n, there are $2^2$ corresponding basis vectors.

A first relative bias vector is formed by splicing a $2^{-(n-1)}$N-dimensional vector $$[+1_{2^{-n}N} \ \ -1_{2^{-n}N}]$$

Remaining relative bias vectors are obtained by cyclically shifting the first relative bias vector by a value of $2^{-1}$ N sequentially.

Normalization is performed on the N basis vectors separately.

For example, an N*N-dimensional cluster sparse domain transformation basis corresponding to FIG. 9 may be expressed as follows:

$$\begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & 0 & 0 & 0 & 0 \\ 0 & 0 & 0 & 0 & 1 & 1 & -1 & -1 \\ 1 & -1 & 0 & 0 & 0 & 0 & 0 & 0 \\ 0 & 0 & 1 & -1 & 0 & 0 & 0 & 0 \\ 0 & 0 & 0 & 0 & 1 & -1 & 0 & 0 \\ 0 & 0 & 0 & 0 & 0 & 0 & 1 & -1 \end{bmatrix}.$$

The foregoing mainly describes the solutions provided in embodiments of this application from a perspective of interaction between network elements. It may be understood that, to implement the foregoing functions, the terminal and the network device include corresponding hardware structures and/or software modules for performing the functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, the terminal may be divided into functional modules based on the foregoing method examples. For example, each functional module may be obtained through division in a correspondence with each function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation.

Figure 10:
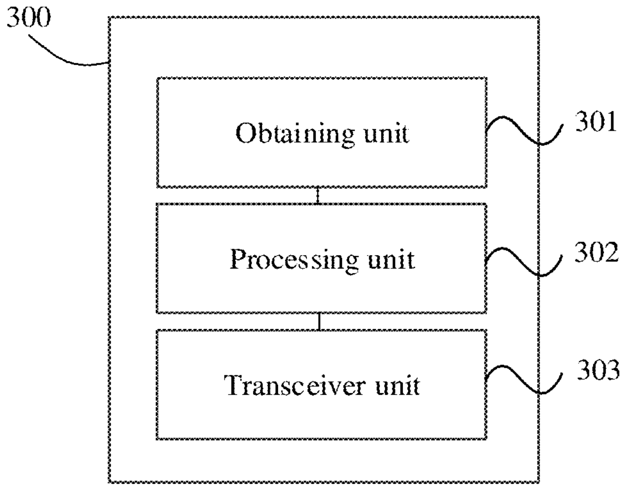
FIG. 10 is a schematic diagram of a structure of a terminal according to an embodiment of this application.

In an example, when each functional module is obtained through division in a correspondence with each function, FIG. 10 is a schematic diagram of a possible structure of a terminal 300 in the foregoing embodiment. As shown in FIG. 10, the terminal 300 may include an obtaining unit 301, a processing unit 302, and a transceiver unit 303. The obtaining unit 301 may be configured to obtain channel state information CSI information of a channel, where the CSI information includes an N-dimensional antenna domain coefficient, and N is an integer greater than 1. The processing unit 302 is configured to perform a beam domain transformation on the CSI information based on an array response feature, to obtain first CSI transformation information, where the first CSI transformation information includes an N-dimensional beam domain coefficient. The processing unit 302 is further configured to perform a cluster sparse domain transformation on the first CSI transformation information based on a cluster sparse transformation basis, to obtain second CSI transformation information, where the second CSI transformation information includes an N-dimensional cluster sparse domain coefficient and the cluster sparse transformation basis is determined based on a channel prior statistical feature of the channel. The transceiver unit 303 is configured to send quantized values of L cluster sparse domain coefficients in the N-dimensional cluster sparse domain coefficient to a second communication apparatus, where L is a positive integer less than N.

On a basis of the foregoing method embodiment, the channel prior statistical feature is used to indicate a statistical covariance matrix corresponding to the N-dimensional beam domain coefficient, and the cluster sparse transformation basis is an eigenvector corresponding to the statistical covariance matrix.

On the basis of the foregoing method embodiment, the transceiver unit 303 is further configured to send indication information to the second communication apparatus, where the indication information is used to indicate the statistical covariance matrix or the eigenvector corresponding to the statistical covariance matrix.

On the basis of the foregoing method embodiment, the statistical covariance matrix is determined based on sample values of a plurality of N-dimensional beam domain coefficients.

On the basis of the foregoing method embodiment, the channel prior statistical feature is used to indicate a cluster sparse feature of a plurality of beam channel clusters corresponding to the N-dimensional beam domain coefficient, and the cluster sparse feature includes at least one of the following: sizes of the beam channel clusters, shapes of the beam channel clusters, and cluster spacings of the beam channel clusters.

On the basis of the foregoing method embodiment, the cluster sparse transformation basis is determined based on the cluster sparse feature of the plurality of beam channel clusters.

On the basis of the foregoing method embodiment, the processing unit 302 is configured to perform a cluster sparse domain transformation on a corresponding beam channel cluster based on a cluster sparse transformation basis of each beam channel cluster, to obtain a plurality of pieces of second CSI transformation sub-information, where the second CSI transformation information includes the plurality of pieces of second CSI transformation sub-information.

On the basis of the foregoing method embodiment, the cluster sparse transformation basis is obtained by performing a cured approximation on the channel prior statistical feature.

On the basis of the foregoing method embodiment, the processing unit 302 is configured to perform amplitude-phase separation on the N-dimensional beam domain coefficient in the first CSI transformation information, to obtain amplitude information and phase information corresponding to each beam domain coefficient; and perform a cluster sparse domain transformation on the amplitude information of each beam domain coefficient in the first CSI transformation information based on the cluster sparse transformation basis, to obtain the second CSI transformation information; and the transceiver unit 303 is configured to send, to the second communication apparatus, the quantized values of the L cluster sparse domain coefficients in the N-dimensional cluster sparse domain coefficient and quantized values of phase information corresponding to the L cluster sparse domain coefficients.

, On the basis of the foregoing method embodiment, the transceiver unit 303 is configured to send, to the second communication apparatus, the quantized values of the L cluster sparse domain coefficients and index values corresponding to the L cluster sparse domain coefficients, where the index values are used to indicate positions of the cluster sparse domain coefficients in the N-dimensional cluster sparse domain coefficient.

On the basis of the foregoing method embodiment, the transceiver unit 303 is configured to receive a first signal sent by the second communication apparatus; and the obtaining unit 301 is configured to obtain the CSI information based on the first signal.

On the basis of the foregoing method embodiment, the L cluster sparse domain coefficients are L coefficients with largest modulus values in the N-dimensional cluster sparse domain coefficient.

Figure 11:
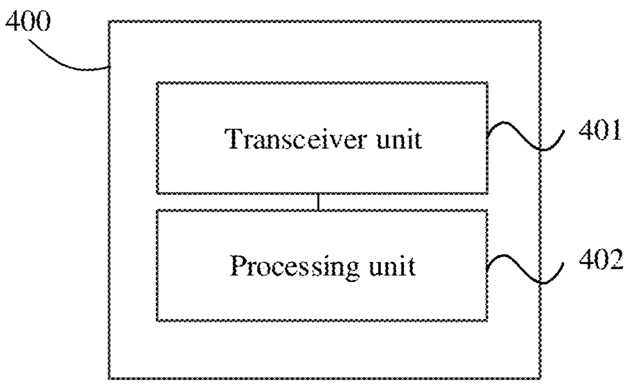
FIG. 11 is a schematic diagram of a structure of a network device according to an embodiment of this application.

In another example, FIG. 11 is a schematic diagram of a possible structure of a network device 400 in the foregoing embodiment. As shown in FIG. 11, the network device 400 may include a transceiver unit 401 and a processing unit 402. The transceiver unit 401 is configured to receive quantized values of L cluster sparse domain coefficients that are sent by a first communication apparatus. The processing unit 402 is configured to perform a cluster sparse domain inverse transformation on the L cluster sparse domain coefficients based on a cluster sparse transformation basis, to obtain first CSI transformation information, where the first CSI transformation information includes an N-dimensional beam domain coefficient, the cluster sparse transformation basis is determined based on a channel prior statistical feature of a channel, N is an integer greater than 1, and L is a positive integer less than N; and the processing unit 402 is further configured to perform a beam domain inverse transformation on the first CSI transformation information based on an array response feature, to obtain CSI information, where the CSI information includes an N-dimensional antenna domain coefficient.

On a basis of the foregoing method embodiment, the channel prior statistical feature is used to indicate a statistical covariance matrix corresponding to the N-dimensional beam domain coefficient, and the cluster sparse transformation basis is an eigenvector corresponding to the statistical covariance matrix.

On the basis of the foregoing method embodiment, the transceiver unit 401 is configured to receive indication information sent by the first communication apparatus, where the indication information is used to indicate the statistical covariance matrix or the eigenvector corresponding to the statistical covariance matrix. On the basis of the foregoing method embodiment, the statistical covariance matrix is determined based on sample values of a plurality of N-dimensional beam domain coefficients.

On the basis of the foregoing method embodiment, the channel prior statistical feature is used to indicate a cluster sparse feature of a plurality of beam channel clusters corresponding to the N-dimensional beam domain coefficient, and the cluster sparse feature includes at least one of the following: sizes of the beam channel clusters, shapes of the beam channel clusters, and cluster spacings of the beam channel clusters.

On the basis of the foregoing method embodiment, the cluster sparse transformation basis is determined based on the cluster sparse feature of the plurality of beam channel clusters.

On the basis of the foregoing method embodiment, the processing unit 402 is configured to perform a cluster sparse inverse transformation on a corresponding beam channel cluster based on a cluster sparse transformation basis of each beam channel cluster, to obtain a plurality of pieces of first CSI transformation sub-information, where the first CSI transformation information includes the plurality of pieces of first CSI transformation sub-information.

On the basis of the foregoing method embodiment, the cluster sparse transformation basis is obtained by performing a cured approximation on the channel prior statistical feature.

On the basis of the foregoing method embodiment, the transceiver unit 401 is configured to receive quantized values of L cluster sparse domain amplitude coefficients and quantized values of phase information corresponding to N cluster sparse domain coefficients that are sent by the first communication apparatus; the processing unit 402 is configured to perform a cluster sparse domain inverse transformation on the L cluster sparse domain amplitude coefficients based on the cluster sparse transformation basis, to obtain an N-dimensional beam domain amplitude coefficient; and the processing unit 402 is configured to perform amplitude-phase combining on the N-dimensional beam domain amplitude coefficient and the N pieces of phase information, to obtain the first CSI transformation information.

On the basis of the foregoing method embodiment, the transceiver unit 401 is further configured to receive the quantized values of the L cluster sparse domain coefficients and index values corresponding to the L cluster sparse domain coefficients that are sent by the first communication apparatus, where the index values are used to indicate positions of the cluster sparse domain coefficients in an N-dimensional cluster sparse domain coefficient.

On the basis of the foregoing method embodiment, the transceiver unit 401 is further configured to send a first signal to the first communication apparatus, to instruct the first communication apparatus to feed back the quantized values of the L cluster sparse domain coefficients based on the first signal.

On the basis of the foregoing method embodiment, the processing unit 402 is configured to obtain second CSI transformation information, where the second CSI transformation information includes an N-dimensional cluster sparse domain coefficient, and the N-dimensional cluster sparse domain coefficient is obtained by padding zeros to the L cluster sparse domain coefficients; and the processing unit 402 is configured to perform a cluster sparse domain inverse transformation on the second CSI transformation information based on the cluster sparse transformation basis, to obtain the first CSI transformation information.

On the basis of the foregoing method embodiment, the processing unit 402 is further configured to perform single-user or multi-user precoding based on the CSI information.

Figure 12:
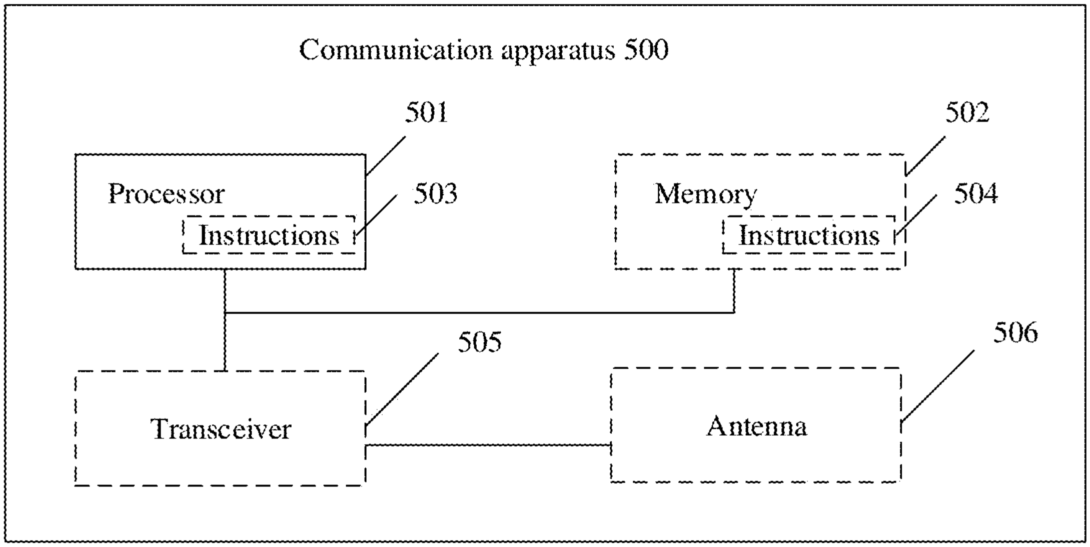
FIG. 12 is a schematic diagram of a structure of an apparatus according to an embodiment of this application.

The following describes an apparatus provided in an embodiment of this application, as shown in FIG. 12.

FIG. 12 is a schematic diagram of a structure of a communication apparatus according to an embodiment of this application. As shown in FIG. 12, the communication apparatus 500 may include a processor 501 and a transceiver 505, and optionally further includes a memory 502.

The transceiver 505 may be referred to as a transceiver unit, a transceiver, a transceiver circuit, or the like, and is configured to implement a transceiver function. The transceiver 505 may include a receiver and a transmitter. The receiver may be referred to as a receiver, a receiving circuit, or the like, and is configured to implement a receiving function. The transmitter may be referred to as a transmitter, a sending circuit, or the like, and is configured to implement a sending function.

The memory 502 may store a computer program, software code, or instructions 504, where the computer program, software code, or instructions 504 may also be referred to as firmware. The processor 501 may control a MAC layer and a PHY layer by running a computer program, software code, or instructions 503 in the processor 501, or by invoking the computer program, software code, or instructions 504 stored in the memory 502, to implement the method provided in the following embodiment of this application. The processor 501 may be a central processing unit (CPU). The memory 502 may be, for example, a read-only memory (ROM) or a random access memory (RAM).

The processor 501 and the transceiver 505 described in this application may be implemented in an integrated circuit (IC), an analog IC, a radio frequency integrated circuit (RFIC), a mixed signal IC, an application specific integrated circuit (ASIC), a printed circuit board (PCB), an electronic device, or the like.

The communication apparatus 500 may further include an antenna 506. Modules included in the communication apparatus 500 are merely examples for description, and are not limited in this application.

As described above, the communication apparatus described in the foregoing embodiment may be a terminal or a network device. However, a scope of the communication apparatus described in this application is not limited thereto, and the structure of the communication apparatus may not be limited to FIG. 12. The communication apparatus may be an independent device or may be a part of a large device. For example, an implementation form of the communication apparatus may be as follows.

An independent integrated circuit IC, a chip, or a chip system or subsystem; a set of one or more ICs, where optionally, the set of ICs may also include a storage component for storing data and instructions; a module that can be embedded in another device; a receiver, an intelligent terminal, a wireless device, a handheld device, a mobile unit, a vehicle-mounted device, a cloud device, an artificial intelligence device, or the like; a network device, a station, a base station; or others.

Figure 13:
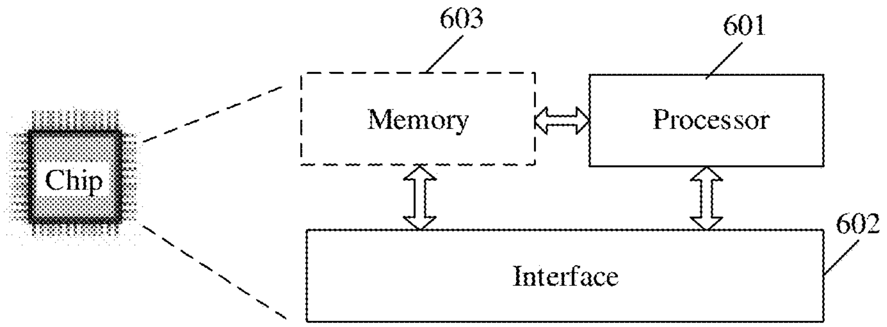
FIG. 13 is a schematic diagram of a structure of a chip according to an embodiment of this application.

For the communication apparatus implemented in the form of a chip or a chip system, refer to a schematic diagram of a structure of a chip shown in FIG. 13. The chip shown in FIG. 13 includes a processor 601 and an interface 602. There may be one or more processors 601, and there may be a plurality of interfaces 602. Optionally, the chip or the chip system may include a memory 603.

All related content of the steps in the method embodiments may be cited in function descriptions of corresponding functional modules. Details are not described herein again.

In a possible implementation, the processor 601 may be a logic circuit or a processing circuit. The interface 602 may be an input/output interface or an input/output circuit. For example, when the apparatus is a first communication apparatus, the input/output interface is configured to obtain CSI information of a channel, the logic circuit is configured to perform the method in the foregoing method embodiment to obtain an N-dimensional cluster sparse domain coefficient based on the CSI information, and the input/output interface is further configured to output quantized values of L cluster sparse domain coefficients in the N-dimensional cluster sparse system. For example, when the apparatus is a second communication apparatus, the input/output interface is configured to obtain quantized values of L cluster sparse domain coefficients, the logic circuit is configured to perform the method in the foregoing method embodiment to obtain CSI information based on the L cluster sparse domain coefficients, and the logic circuit may be further configured to perform single-user or multi-user precoding based on the CSI information.

This application further provides a communication system, including the network device and the terminal in the foregoing embodiments.

Embodiments of this application further provide a computer-readable storage medium. All or some of the foregoing embodiments may be implemented by using software, hardware, firmware, or any combination thereof. If the embodiments are implemented in software, a function may be stored on the computer-readable storage medium as one or more instructions or code or transmitted on a computer-readable medium. The computer-readable medium may include a computer storage medium and a communication medium, and may further include any medium that can transfer a computer program from one place to another place. The storage medium may be any usable medium accessible by a computer.

In an optional design, the computer-readable medium may include a RAM, a ROM, an EEPROM, a CD-ROM or another optical disc storage, a magnetic disk storage or another: magnetic storage device, or any other medium that can be used to carry or store desired program code in a form of an instruction or a data structure and that can be accessed by a computer. In addition, any connection is appropriately referred to as a computer-readable medium. For example, if a coaxial cable, an optical fiber cable, a twisted pair, a digital subscriber line (DSL), or a wireless technology (such as infrared, radio, or microwave) is used to transmit software from a website, a server, or another remote source, the coaxial cable, optical fiber cable, twisted pair, DSL, or wireless technology such as infrared, radio, or microwave is included in the definition of the medium. Magnetic disks and optical discs used in this specification include compact discs (CDs), laser discs, optical discs, digital versatile discs (DVDs), floppy disks, and Blu-ray discs, where the magnetic disks typically reproduce data magnetically, and the optical discs reproduce data optically by using lasers. The combination described above should also be included in the scope of the computer-readable medium.

Embodiments of this application further provide a computer program product. All or some of the foregoing embodiments may be implemented by using software, hardware, firmware, or any combination thereof. If implemented in software, the embodiments may be implemented in whole or in part in a form of a computer program product. The computer program product includes one or more computer instructions. When the computer program instructions are loaded and executed on a computer, all or a part of the processes or functions described in the foregoing method embodiments are generated.

The embodiments of this application are described above with reference to the accompanying drawings. However, this application is not limited to the foregoing specific implementations, and the foregoing specific implementations are merely illustrative and not restrictive. Inspired by this application, a person of ordinary skill in the art may further work out a plurality of forms without departing from the essence of this application and the protection scope of the claims, and all the forms shall fall within the protection scope of this application.

What is claimed is:

1. A channel state information (CSI) information processing method, comprising:

obtaining CSI information of a channel, wherein the CSI information comprises an N-dimensional antenna domain coefficient, and N is an integer greater than 1;

obtaining first CSI transformation information based on performing a beam domain transformation on the CSI information based on an array response feature, wherein the first CSI transformation information comprises an N-dimensional beam domain coefficient;

obtaining second CSI transformation information based on performing a cluster sparse domain transformation on the first CSI transformation information based on a cluster sparse transformation basis, wherein the second CSI transformation information comprises an N-dimensional cluster sparse domain coefficient and the cluster sparse transformation basis is determined based on a channel prior statistical feature of the channel; and sending quantized values of L cluster sparse domain coefficients in the N-dimensional cluster sparse domain coefficient to a second communication apparatus, wherein L is a positive integer less than N, wherein the channel prior statistical feature indicates a statistical covariance matrix corresponding to the N-dimensional beam domain coefficient, and the cluster sparse transformation basis is an eigenvector corresponding to the statistical covariance matrix.

2. The method according to claim 1, wherein the method further comprises:

sending indication information to the second communication apparatus, wherein the indication information indicates the statistical covariance matrix or the eigenvector corresponding to the statistical covariance matrix.

3. The method according to claim 1, wherein the statistical covariance matrix is determined based on sample values of a plurality of N-dimensional beam domain coefficients.

4. The method according to claim 1, wherein the channel prior statistical feature indicates a cluster sparse feature of a plurality of beam channel clusters corresponding to the N-dimensional beam domain coefficient, and wherein the cluster sparse feature comprises at least one of sizes of the beam channel clusters, shapes of the beam channel clusters, or cluster spacings of the beam channel clusters.

5. The method according to claim 4, wherein the cluster sparse transformation basis is determined based on the cluster sparse feature of the plurality of beam channel clusters.

6. The method according to claim 4, wherein the performing the cluster sparse domain transformation on the first CSI transformation information based on the cluster sparse transformation basis comprises:

obtaining a plurality of pieces of second CSI transformation sub-information based on performing a cluster sparse domain transformation on a corresponding beam channel cluster based on a cluster sparse transformation basis of each beam channel cluster, wherein the second CSI transformation information comprises the plurality of pieces of second CSI transformation sub-information.

7. The method according to claim 1, wherein the cluster sparse transformation basis is obtained by performing a cured approximation on the channel prior statistical feature.

8. The method according to claim 1, wherein the performing the cluster sparse domain transformation on the first CSI transformation information based on the cluster sparse transformation basis comprises:

obtaining amplitude information and phase information corresponding to each beam domain coefficient based on performing amplitude-phase separation on the N-dimensional beam domain coefficient in the first CSI transformation information;

obtaining the second CSI transformation information based on performing a cluster sparse domain transformation on the amplitude information of each beam domain coefficient in the first CSI transformation information based on the cluster sparse transformation basis; and sending, to the second communication apparatus, the quantized values of the L cluster sparse domain coefficients in the N-dimensional cluster sparse domain coefficient and quantized values of phase information corresponding to the L cluster sparse domain coefficients.

9. The method according to claim 1, wherein sending the quantized values of the L cluster sparse domain coefficients in the N-dimensional cluster sparse domain coefficient to the second communication apparatus comprises:

sending, to the second communication apparatus, the quantized values of the L cluster sparse domain coefficients and index values corresponding to the L cluster sparse domain coefficients, wherein the index values indicate positions of the L cluster sparse domain coefficients in the N-dimensional cluster sparse domain coefficient.

10. The method according to claim 1, wherein the method further comprises:

receiving a first signal sent by the second communication apparatus; and wherein the obtaining CSI information of a channel comprises:

obtaining the CSI information based on the first signal.

11. The method according to claim 1, wherein the L cluster sparse domain coefficients are L coefficients with largest modulus values in the N-dimensional cluster sparse domain coefficient.

12. A communication apparatus, comprising:

an obtaining unit, the obtaining unit comprised of one or more circuits, software, or both that are configured to obtain channel state information (CSI) information of a channel, wherein the CSI information comprises an N-dimensional antenna domain coefficient, and N is an integer greater than 1, a processing unit;

a non-transitory computer-readable storage medium storing a program to be executed by the processing unit, the program including instructions to:

obtain first CSI transformation information based on performing a beam domain transformation on the CSI information based on an array response feature, wherein the first CSI transformation information comprises an N-dimensional beam domain coefficient;

obtain second CSI transformation information based on performing a cluster sparse domain transformation on the first CSI transformation information based on a cluster sparse transformation basis, wherein the second CSI transformation information comprises an N-dimensional cluster sparse domain coefficient and the cluster sparse transformation basis is determined based on a channel prior statistical feature of the channel; and a transceiver unit configured to send quantized values of L cluster sparse domain coefficients in the N-dimensional cluster sparse domain coefficient to a second communication apparatus, wherein L is a positive integer less than N, wherein the channel prior statistical feature indicates a statistical covariance matrix corresponding to the N-dimensional beam domain coefficient, and the cluster sparse transformation basis is an eigenvector corresponding to the statistical covariance matrix.

13. The apparatus according to claim 12, wherein the statistical covariance matrix is determined based on sample values of a plurality of N-dimensional beam domain coefficients.

14. The apparatus according to claim 12, wherein the channel prior statistical feature indicates a cluster sparse feature of a plurality of beam channel clusters corresponding to the N-dimensional beam domain coefficient, and the cluster sparse feature comprises at least one of sizes of the beam channel clusters, shapes of the beam channel clusters, or cluster spacings of the beam channel clusters.

15. The apparatus according to claim 12, wherein the cluster sparse transformation basis is obtained by performing a cured approximation on the channel prior statistical feature.

16. The apparatus according to claim 12, wherein the instructions further include instructions to:

obtain amplitude information and phase information corresponding to each beam domain coefficient based on performing amplitude-phase separation on the N-dimensional beam domain coefficient in the first CSI transformation information; and obtain the second CSI transformation information based on performing a cluster sparse domain transformation on the amplitude information of each beam domain coefficient in the first CSI transformation information based on the cluster sparse transformation basis; and wherein the transceiver unit is further configured to send, to the second communication apparatus, the quantized values of the L cluster sparse domain coefficients in the N-dimensional cluster sparse domain coefficient and quantized values of phase information corresponding to the L cluster sparse domain coefficients.

17. The apparatus according to claim 12, wherein the transceiver unit is further configured to send, to the second communication apparatus, the quantized values of the L cluster sparse domain coefficients and index values corresponding to the L cluster sparse domain coefficients, wherein the index values indicate positions of the L cluster sparse domain coefficients in the N-dimensional cluster sparse domain coefficient.

18. A non-transitory computer-readable storage medium storing a program to be executed by a processor, the program including instructions for:

obtaining CSI information of a channel, wherein the CSI information comprises an N-dimensional antenna domain coefficient, and N is an integer greater than 1;

obtaining first CSI transformation information based on performing a beam domain transformation on the CSI information based on an array response feature, wherein the first CSI transformation information comprises an N-dimensional beam domain coefficient;

obtaining second CSI transformation information based on performing a cluster sparse domain transformation on the first CSI transformation information based on a cluster sparse transformation basis, wherein the second CSI transformation information comprises an N-dimensional cluster sparse domain coefficient and the cluster sparse transformation basis is determined based on a channel prior statistical feature of the channel; and sending quantized values of L cluster sparse domain coefficients in the N-dimensional cluster sparse domain coefficient to a second communication apparatus, wherein Lis a positive integer less than N, wherein the channel prior statistical feature indicates a statistical covariance matrix corresponding to the N-dimensional beam domain coefficient, and the cluster sparse transformation basis is an eigenvector corresponding to the statistical covariance matrix.

* * * * *